Figure 23:
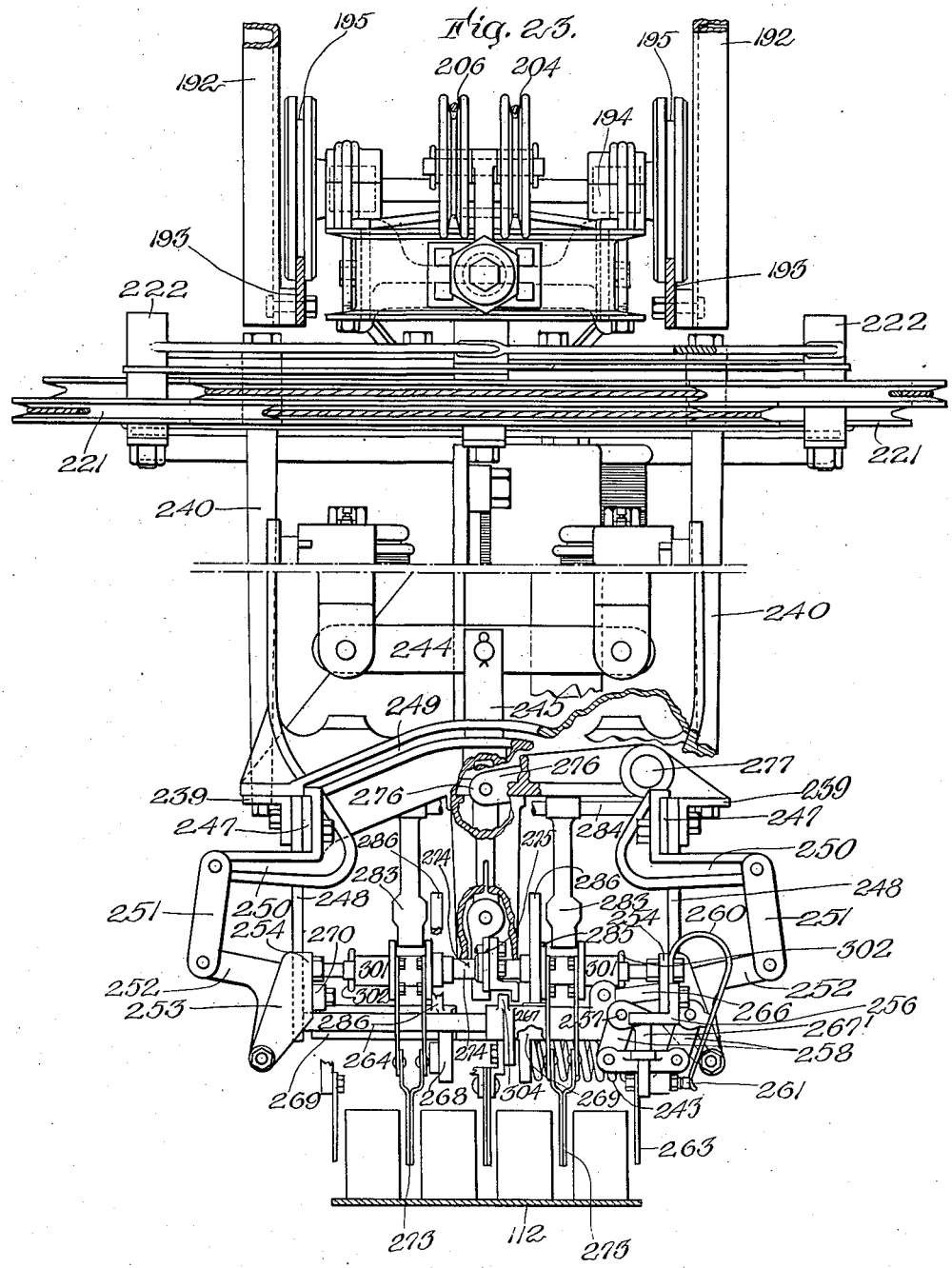

R. C. PENFIELD.
BRICK HACKING APPARATUS.
APPLICATION FILED JAN. 13, 1911.
1,026,046.
Patented May 14, 1912.
24 SHEETS—SHEET 1.
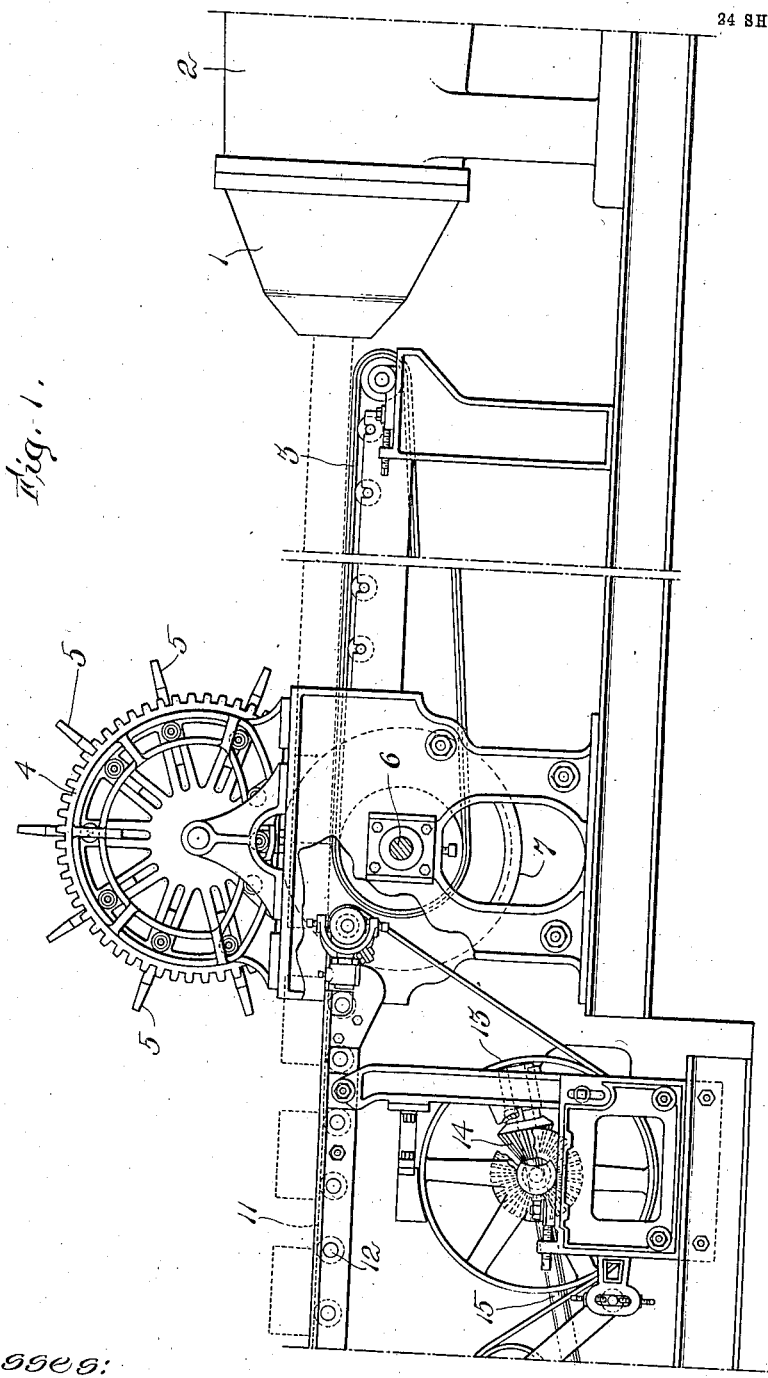

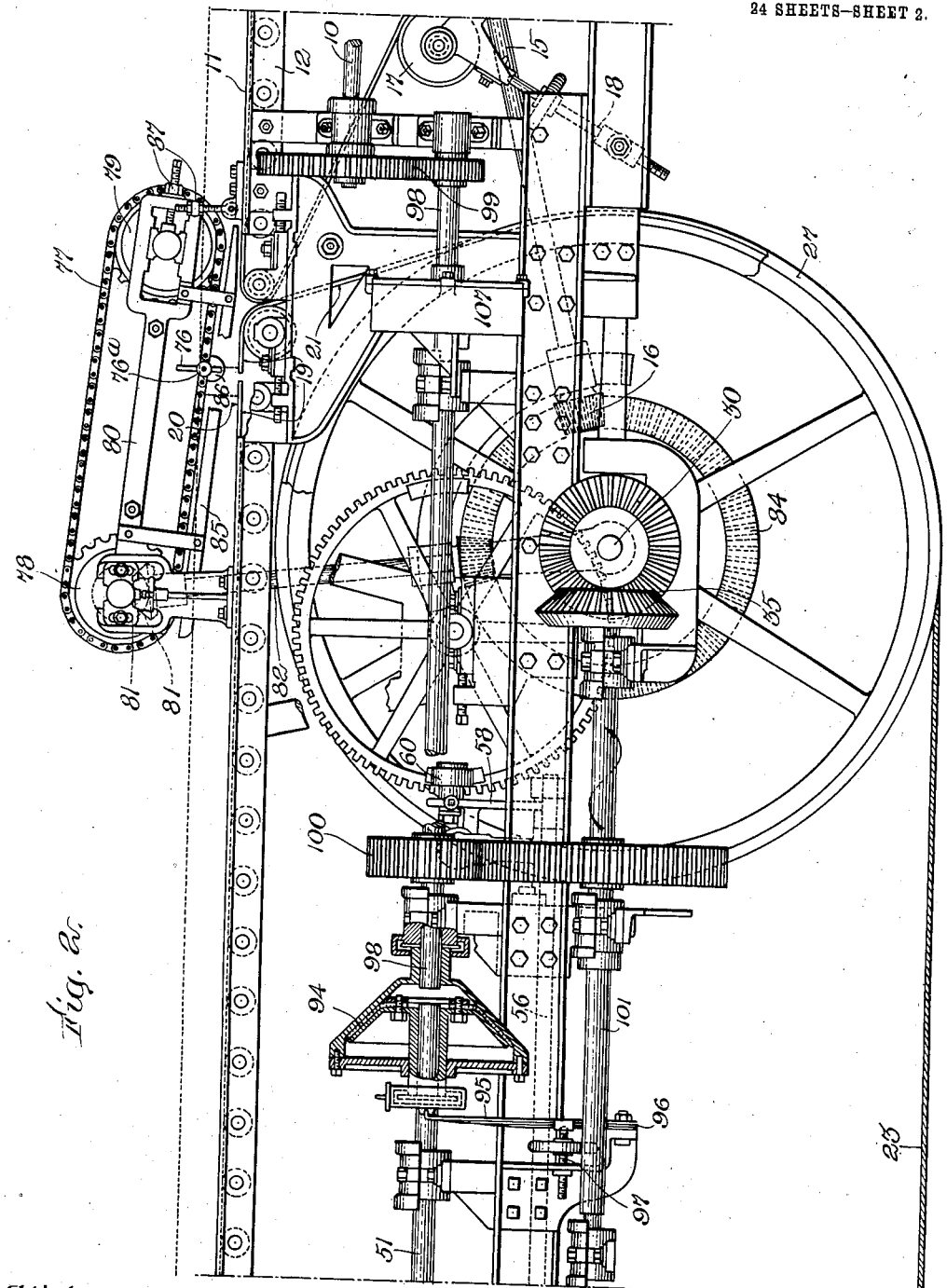

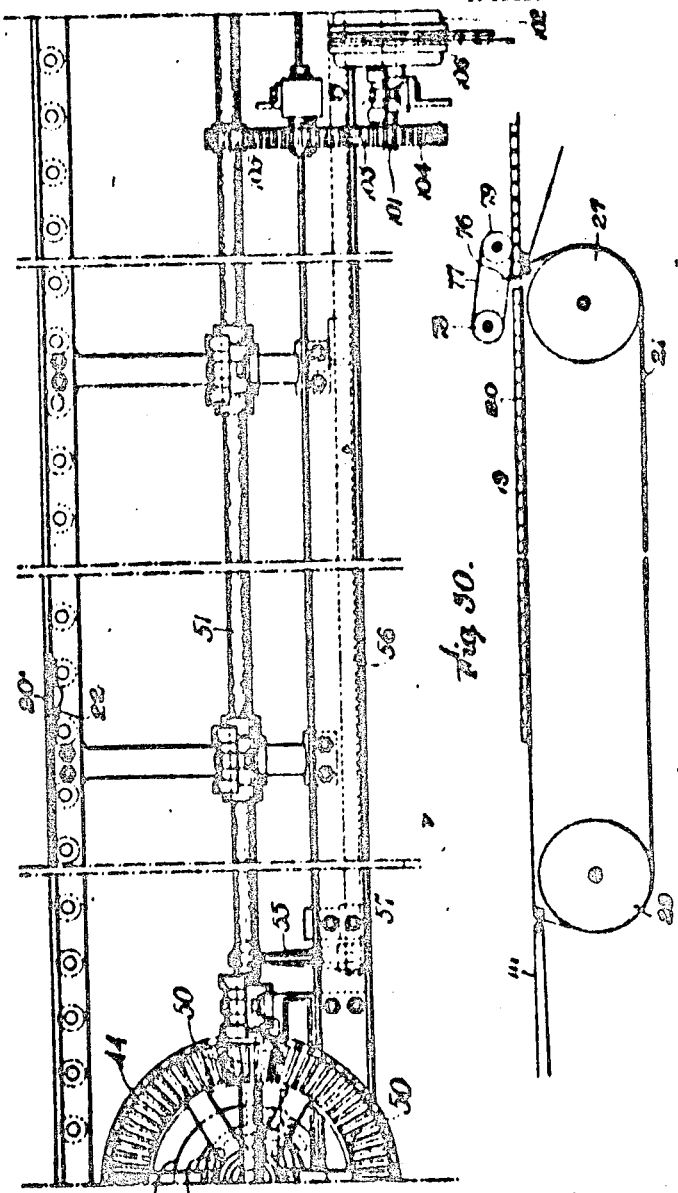

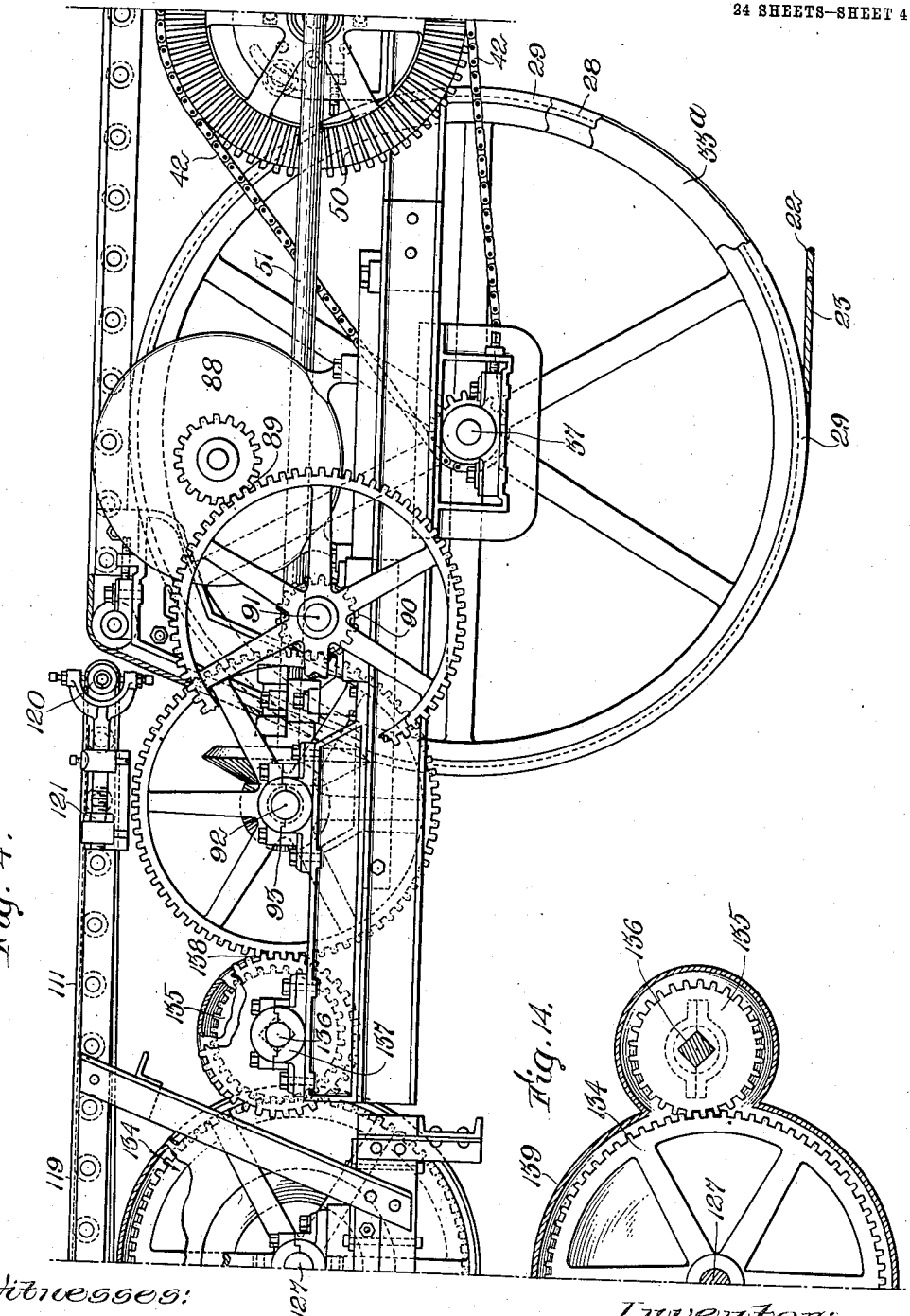

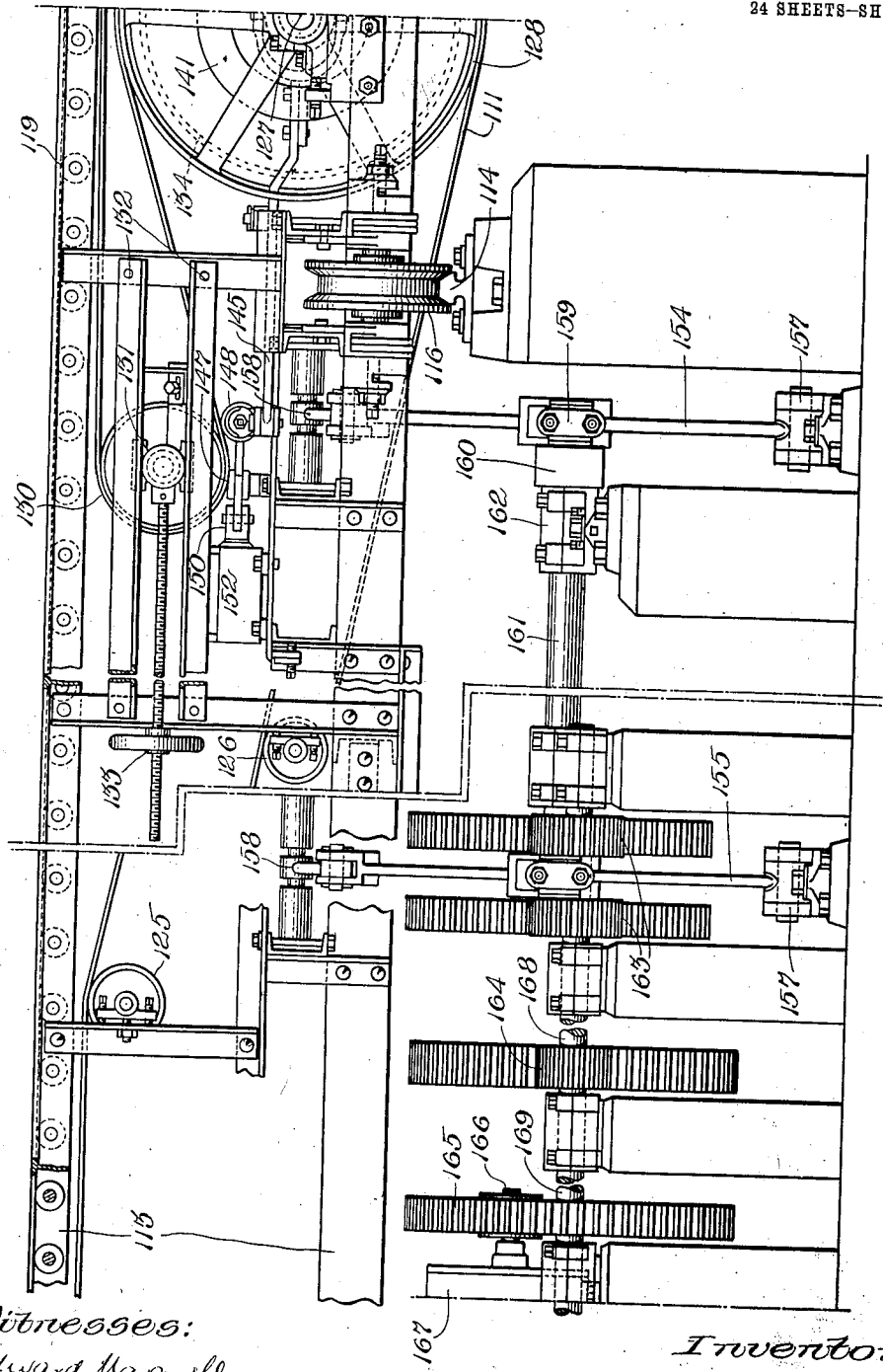

R. C. PENFIELD.
BRICK HACKING APPARATUS.
APPLICATION FILED JAN. 13, 1911.
1,026,046.
Patented May 14, 1912.
24 SHEETS—SHEET 6.
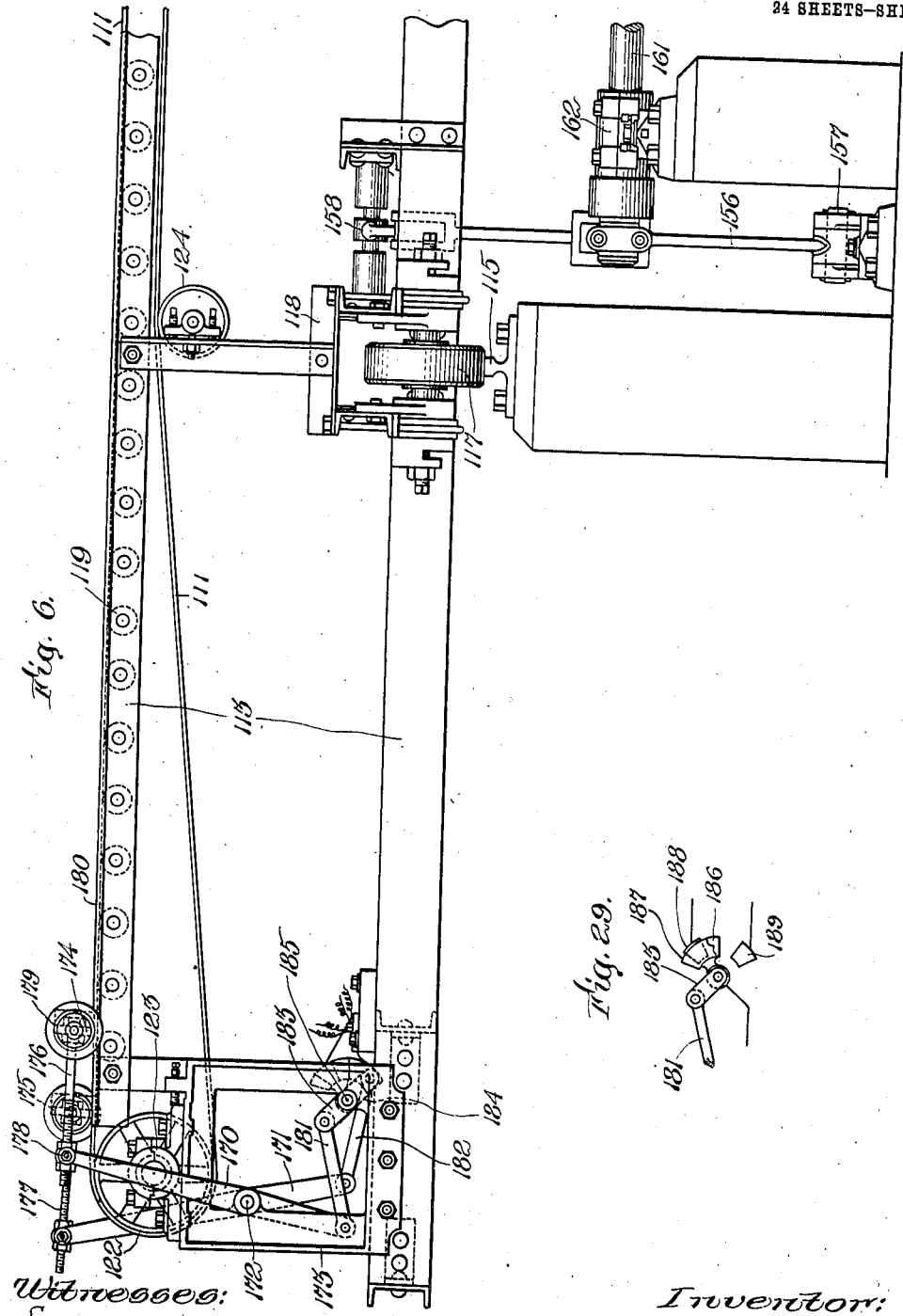

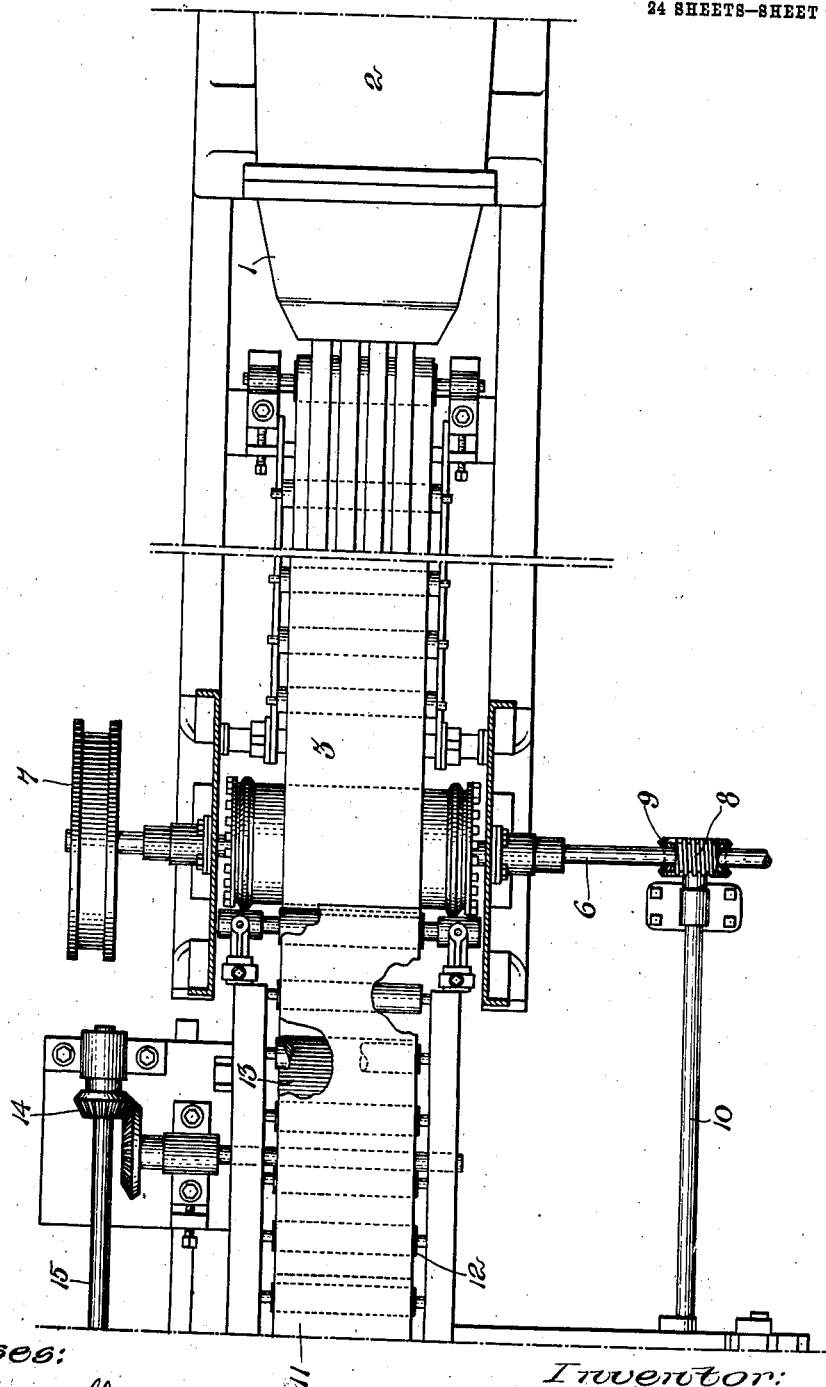

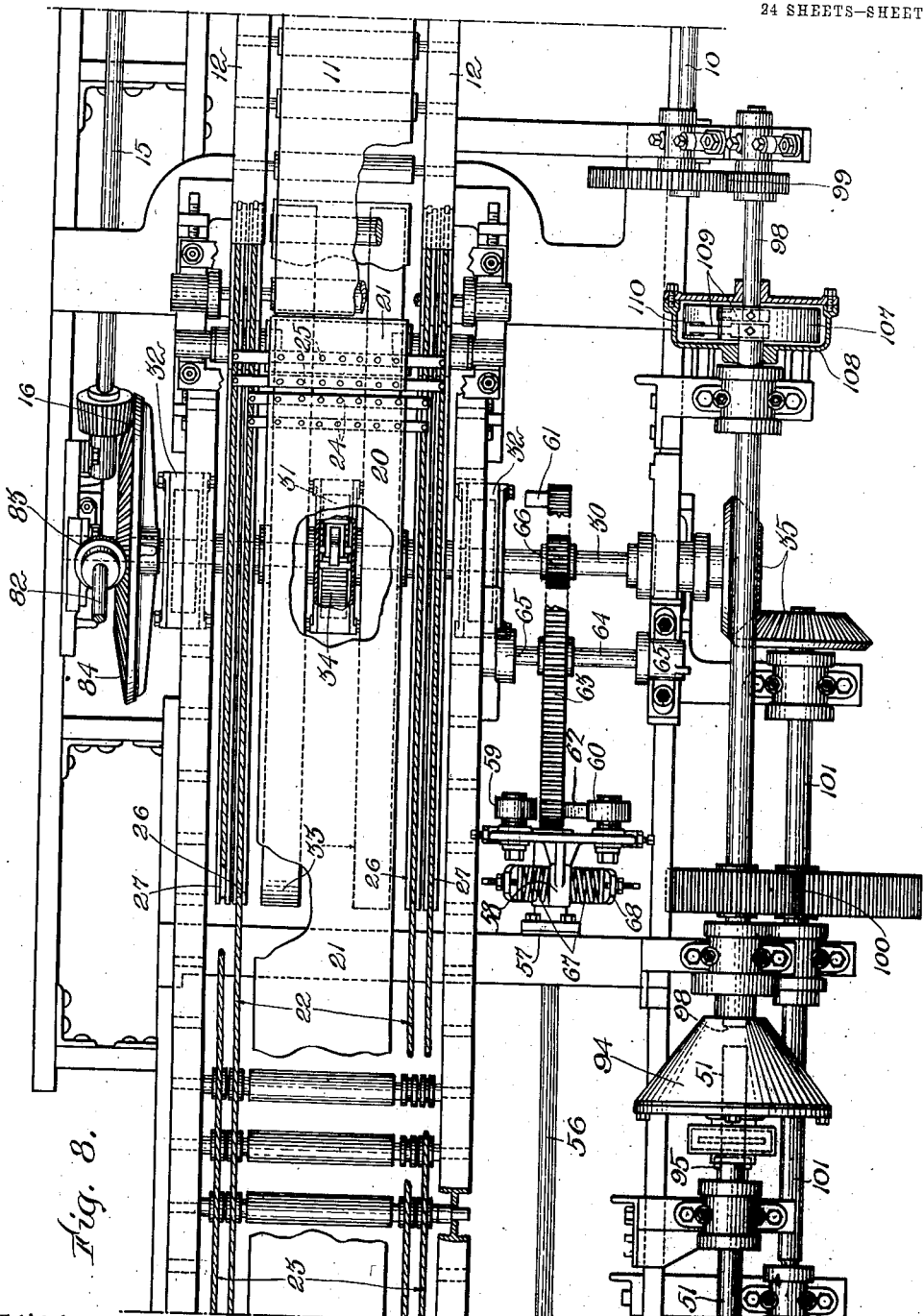

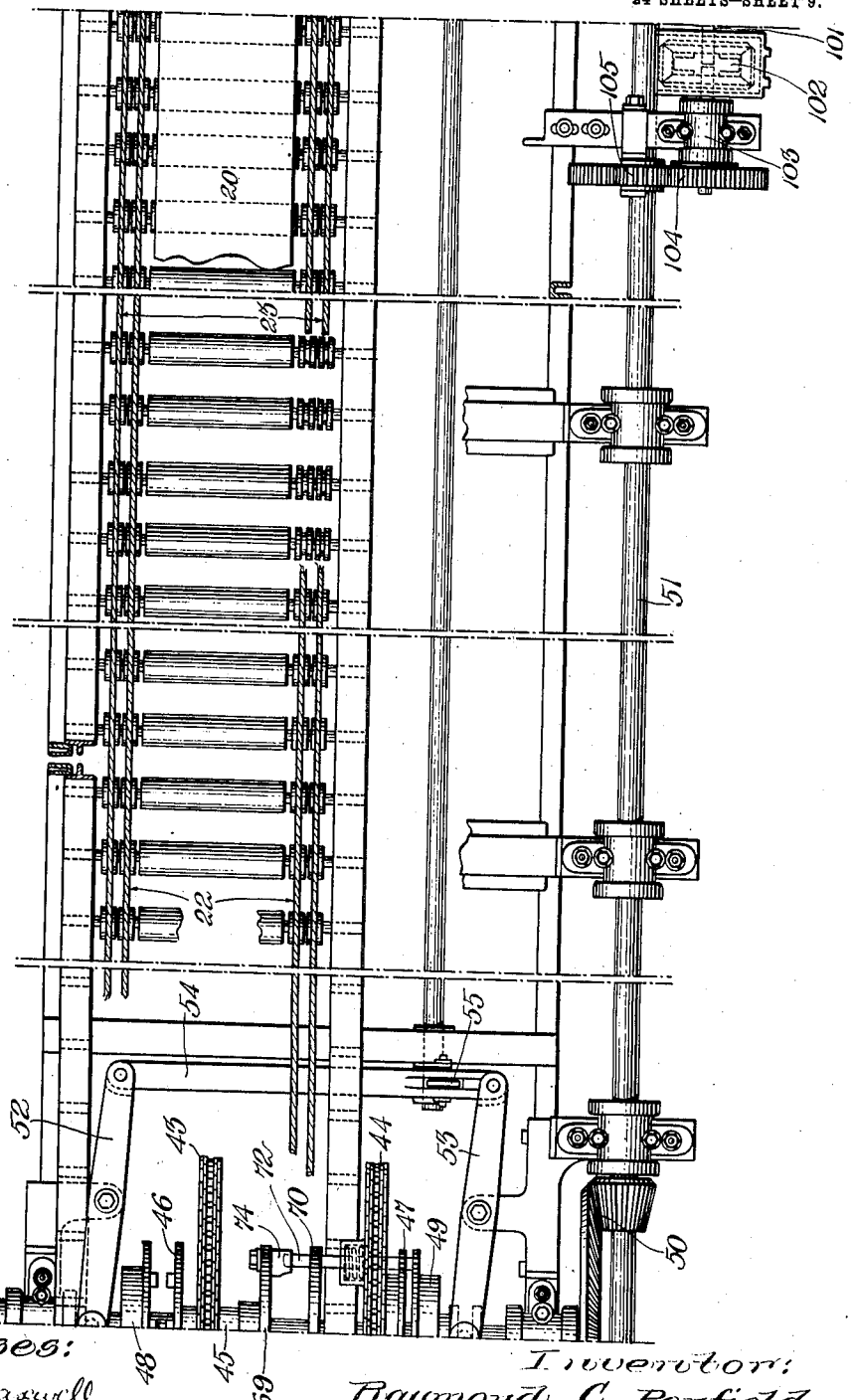

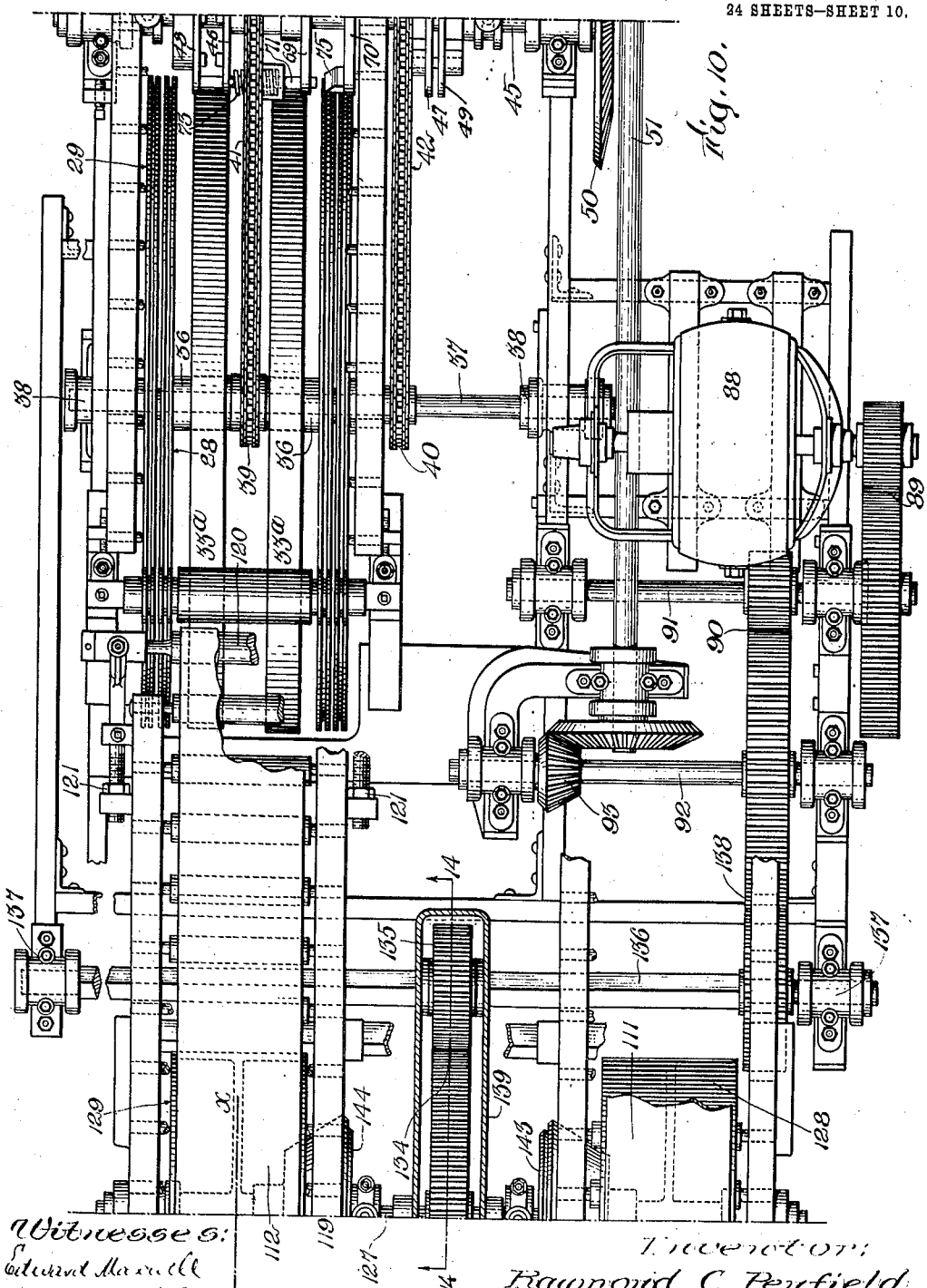

R. C. PENFIELD.
BRICK HACKING APPARATUS.
APPLICATION FILED JAN. 13, 1911.
1,026,046.
Patented May 14, 1912.
24 SHEETS—SHEET 11.
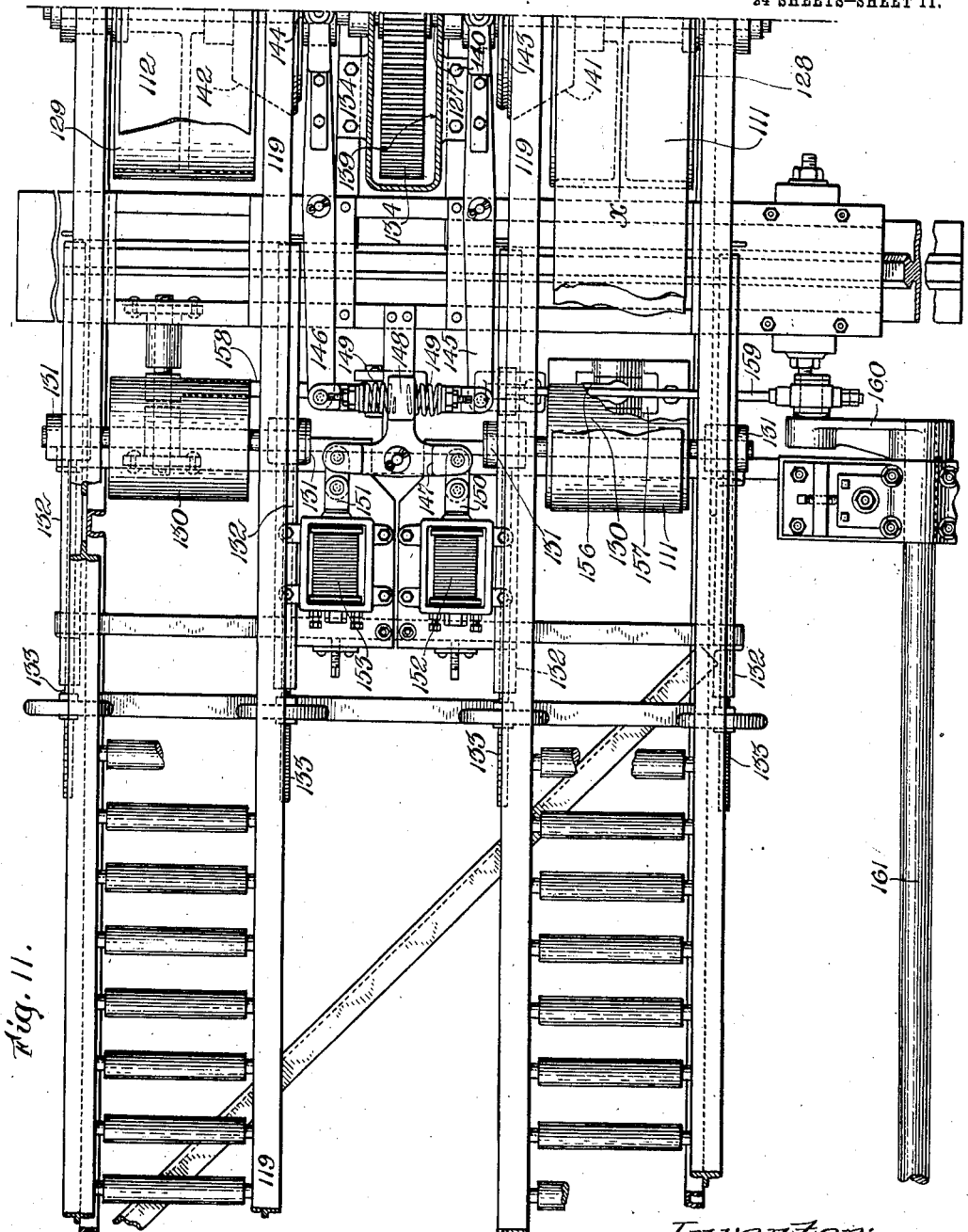
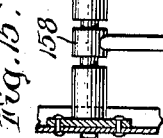

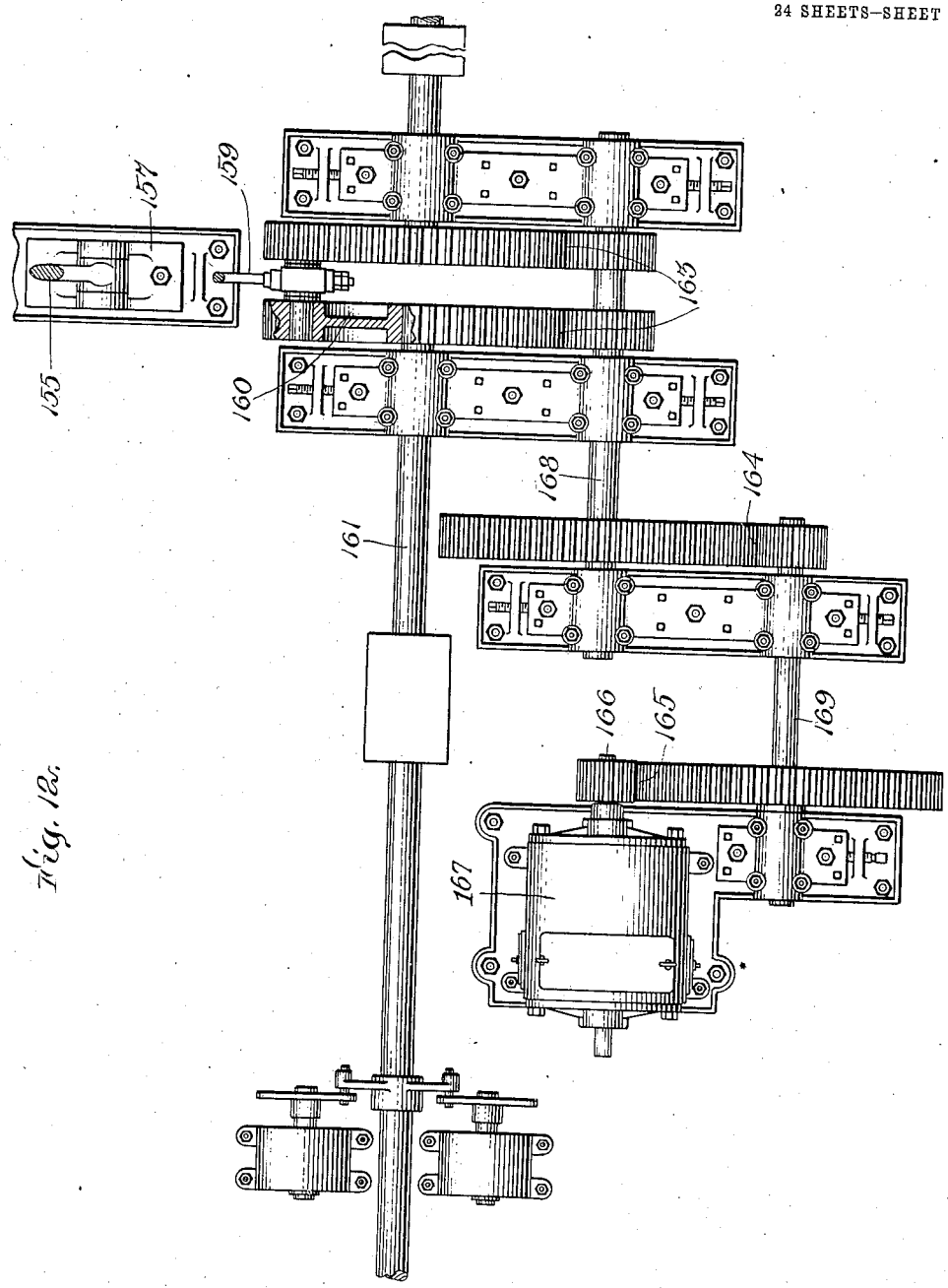

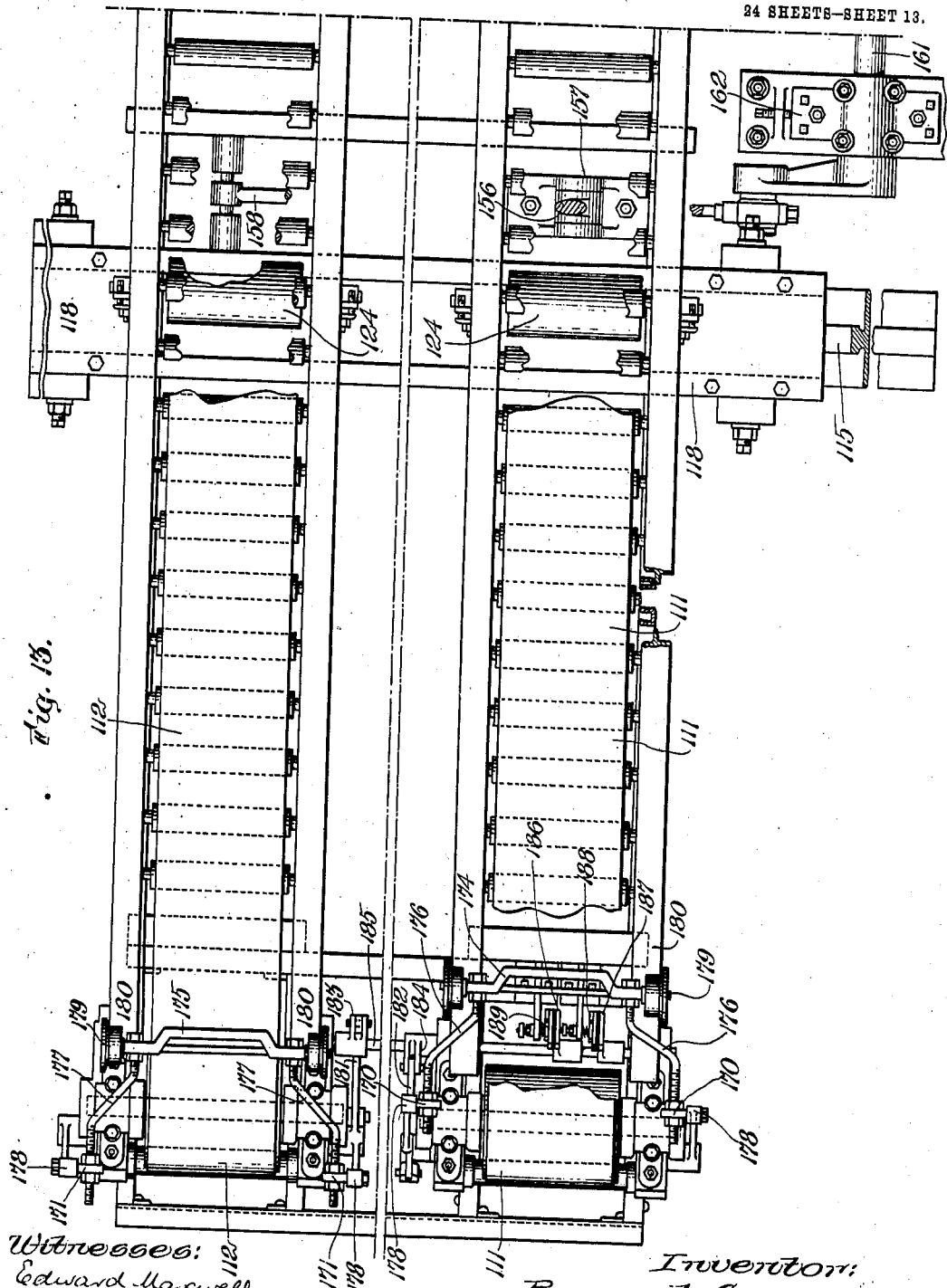

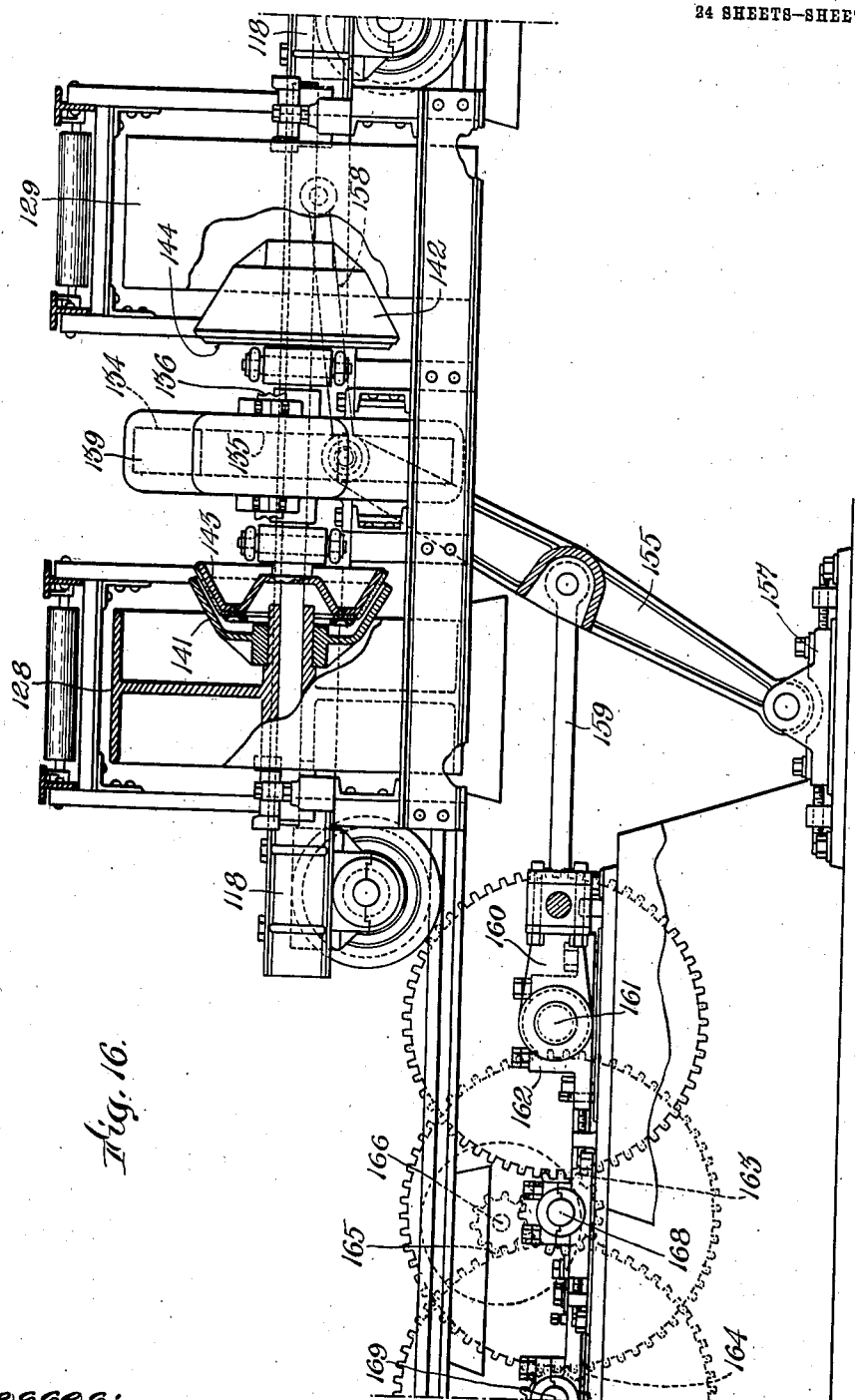

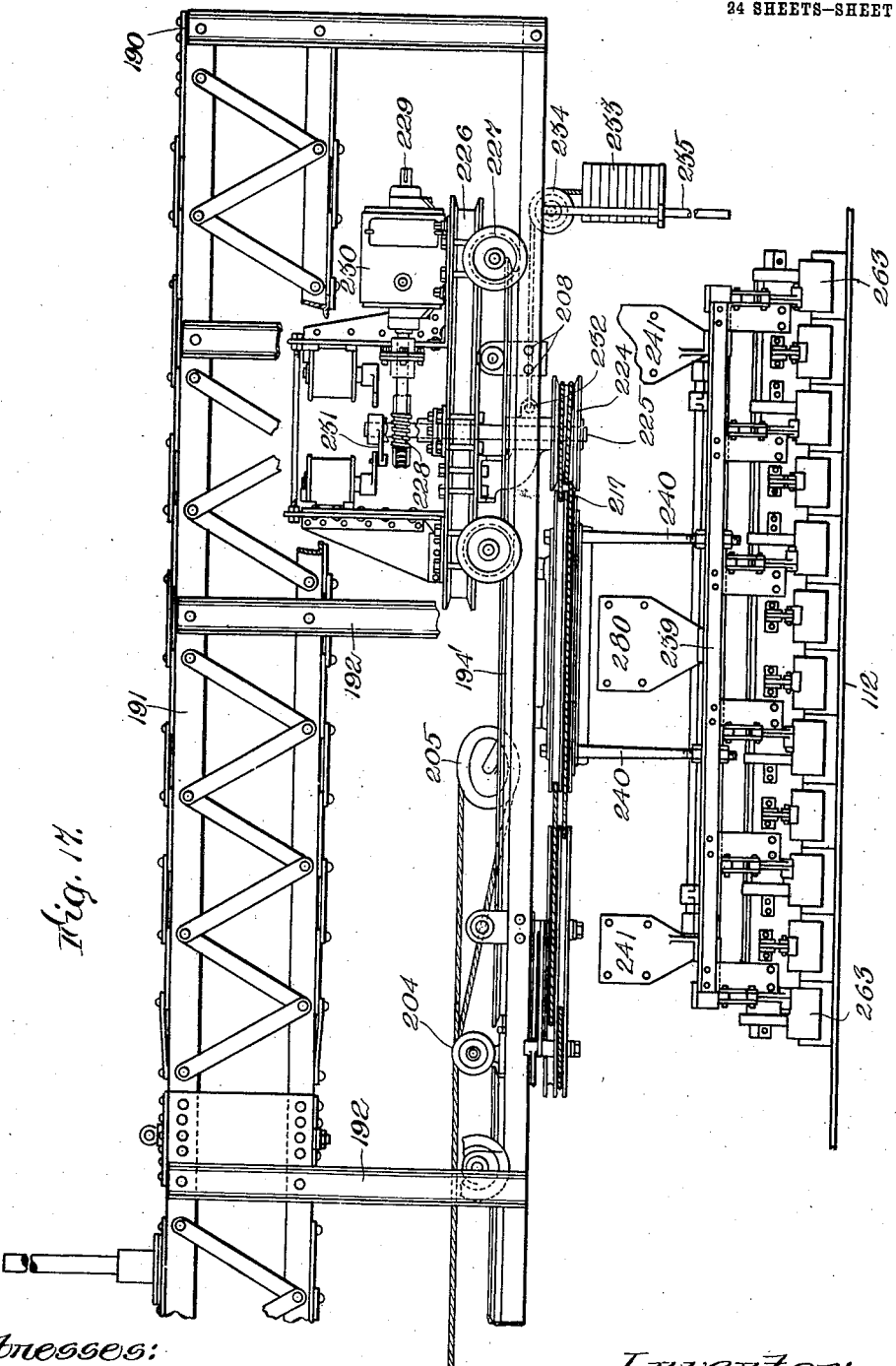

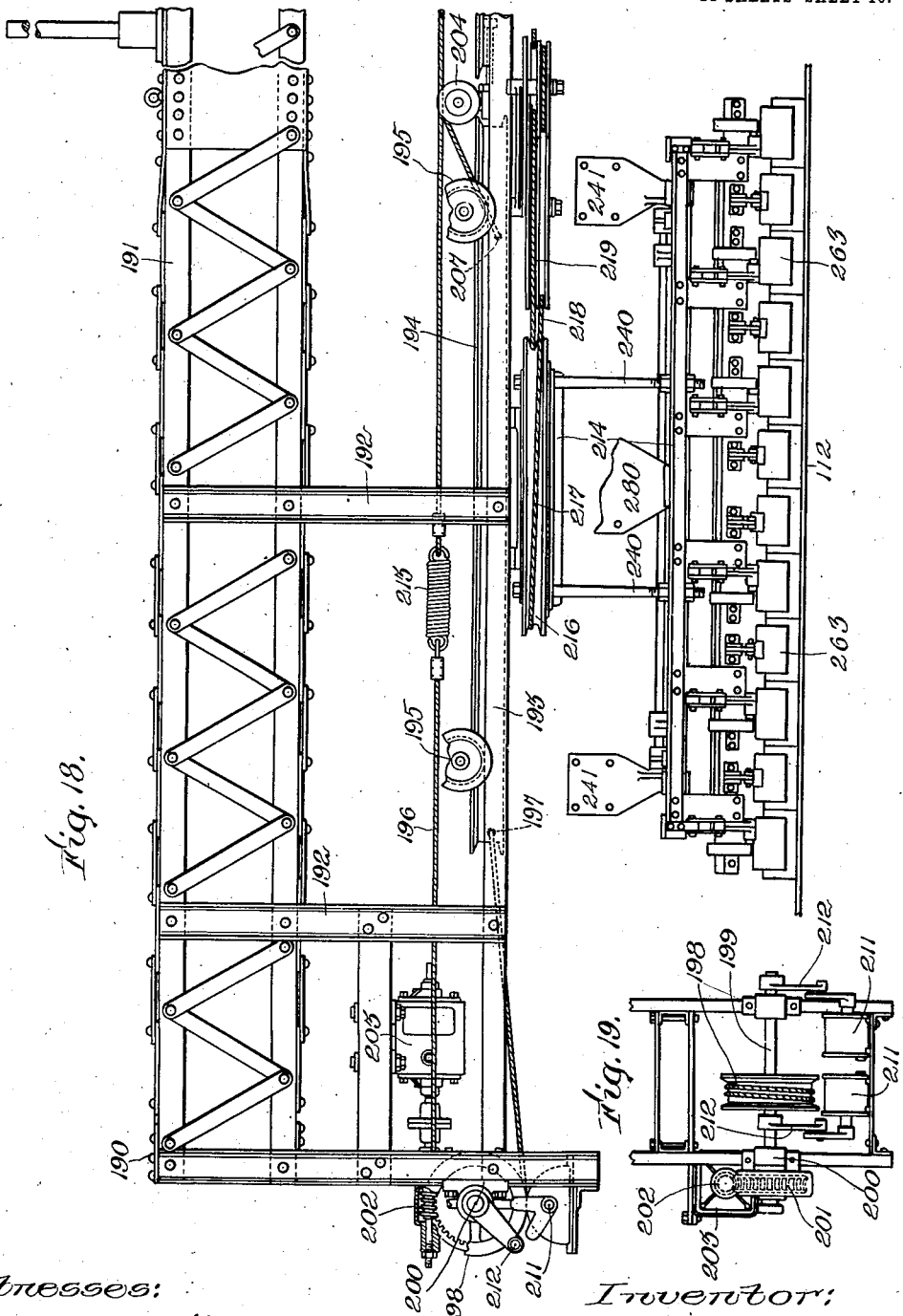

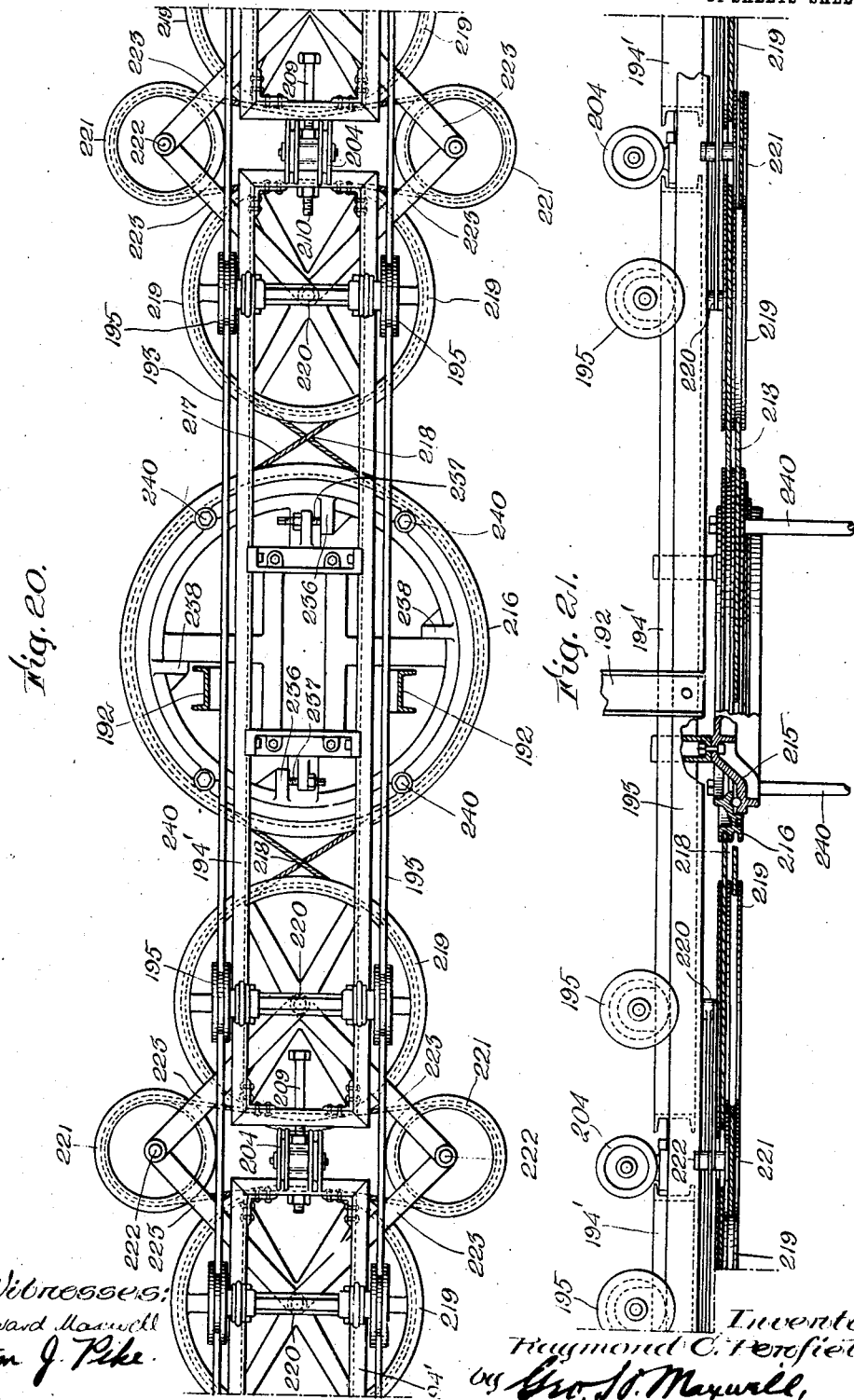

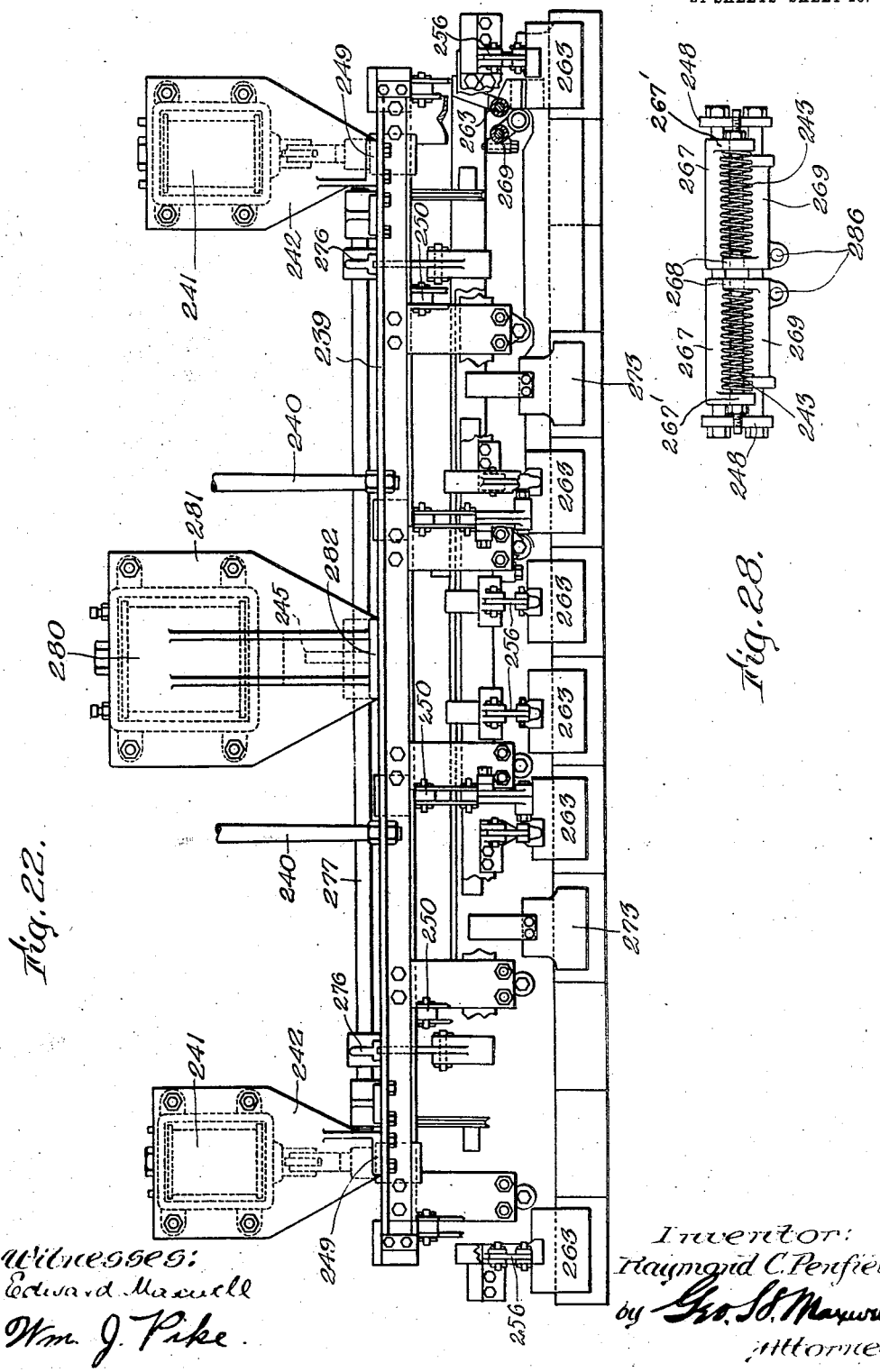

R. C. PENFIELD.
BRICK HACKING APPARATUS.
APPLICATION FILED JAN. 13, 1911.

1,026,046.

Patented May 14, 1912.
24 SHEETS—SHEET 19.

Witnesses:
Edward Maxwell
Wm. J. Pike

Inventor:
Raymond C. Penfield,
by Geo. H. Maxwell,
Attorney.

R. C. PENFIELD.
BRICK HACKING APPARATUS.
APPLICATION FILED JAN. 13, 1911.
1,026,046.
Patented May 14, 1912.
24 SHEETS—SHEET 20.
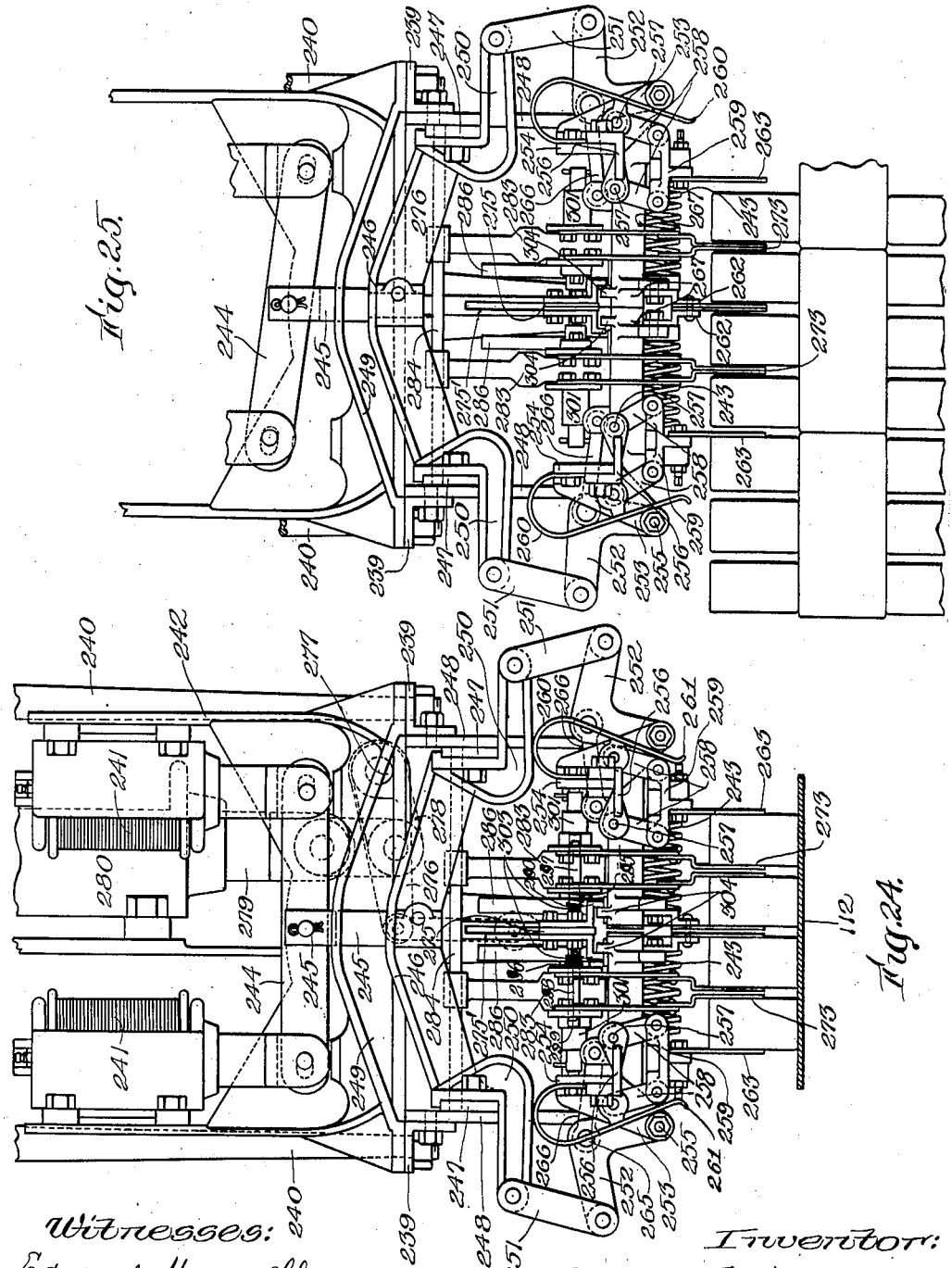

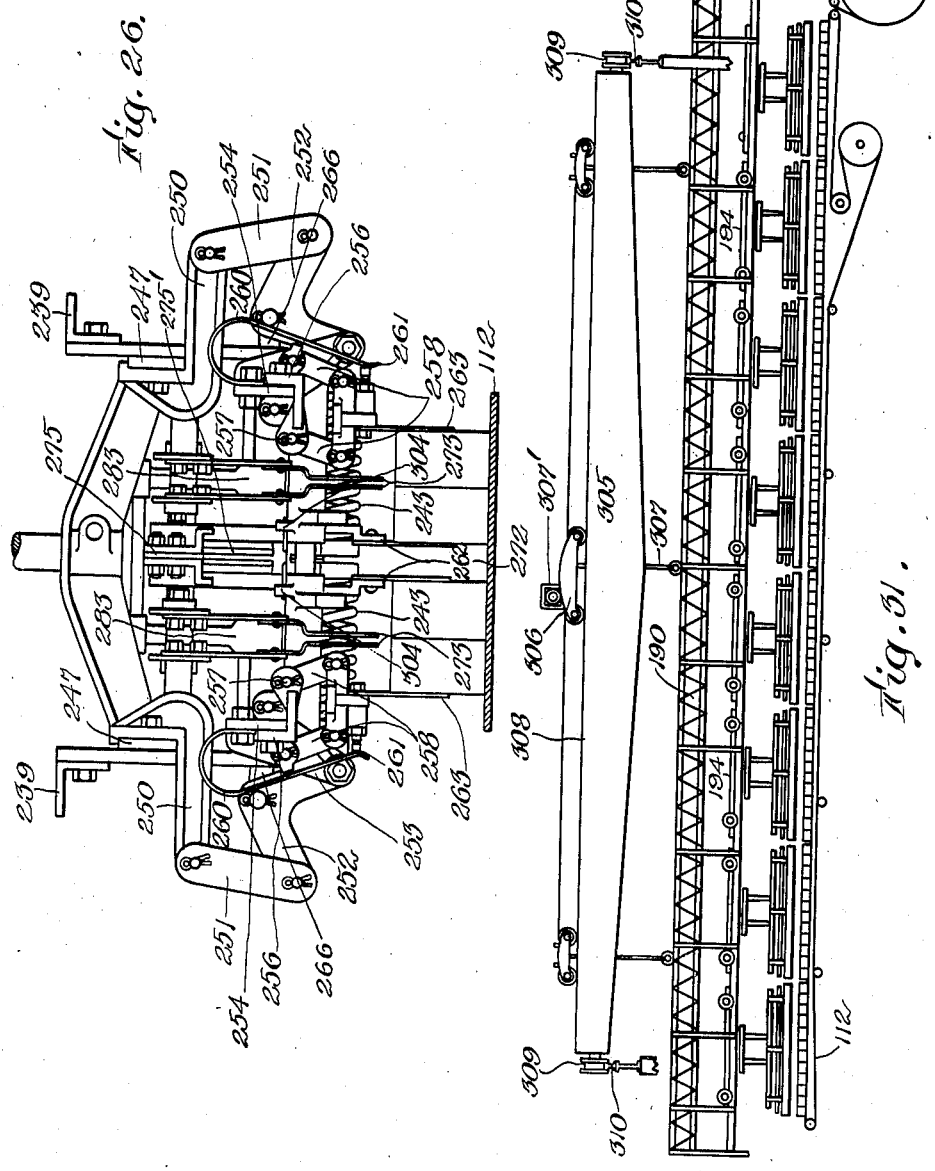

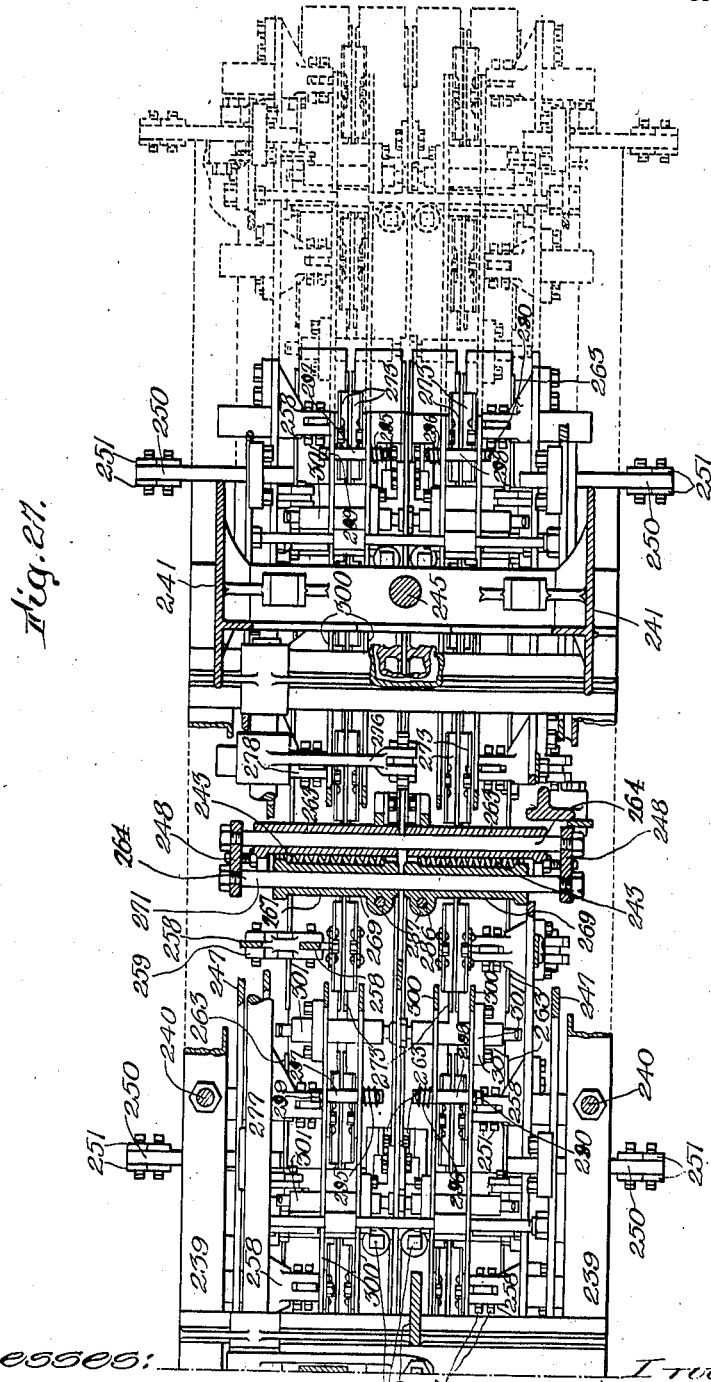

R. C. PENFIELD.
BRICK HACKING APPARATUS.
APPLICATION FILED JAN. 13, 1911.

1,026,046.

Patented May 14, 1912.
24 SHEETS—SHEET 23.

Witnesses:
Edward Maxwell
Wm. J. Pike.

Inventor:
Raymond C. Penfield,
by Geo. S. Maxwell,
Attorney.

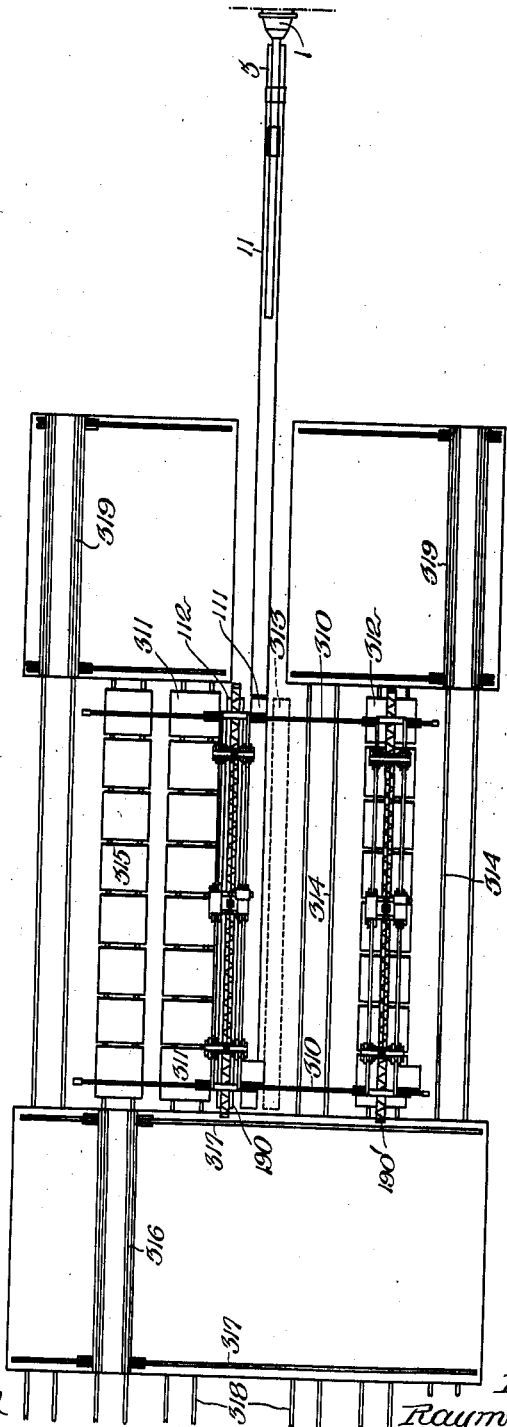

UNITED STATES PATENT OFFICE.

RAYMOND C. PENFIELD, OF NEW YORK, N. Y.

BRICK-HACKING APPARATUS.

1,026,046.  Specification of Letters Patent.  Patented May 14, 1912.

Application filed January 13, 1911. Serial No. 602,458.

*To all whom it may concern:*

Be it known that I, RAYMOND C. PENFIELD, a citizen of the United States, residing at New York, in the county of New York and State of New York, have invented an Improvement in Brick-Hacking Apparatus, of which the following description, in connection with the accompanying drawings, is a specification, like letters on the drawings representing like parts.

The handling of soft or green bricks as they are produced on a large scale in present day practice as a series of continuous streams from a molding machine, to arrange them in proper spaced relation and stacked formation for drying and burning, such handling being known in the art as "hacking", presents problems of practical difficulty, since the great number capable of being delivered by a molding machine must be conveyed to the hacking apparatus and there arranged in properly spaced and stacked formation, and all this must be done with due regard to the fact that the bricks in their soft condition are peculiarly susceptible to damage by distortion or chipping off of edges or corners thereof.

The apparatus of the present invention is of prime importance in that it effects a very great saving of labor by handling the bricks in very large quantities automatically and without any manual handling whatever from the time they are delivered by the molding machine until they are deposited in hacked relation on the drier car (or directly into the drier or burning kiln). Further, by reason of the fact that all handling of the bricks until they are deposited for drying or burning is by automatic apparatus specially designed, as later set forth, to practically eliminate the possibility of damage to the individual bricks by chipping or distortion thereof, it is evident that a greatly improved quality of output is attained.

The present invention effects the handling and deposit of the desired number of streams of the brick material automatically and without manual intervention, directly from the molding machine to the hacking stack. The apparatus receives a desired number of continuous streams of bricks as they are molded, and forwards the same in units or bunches with a time interval between deliveries to a hacking mechanism, the conveyer system for this purpose having provision for a time interval of rest for the delivery end portion of the system, adapted to coöperate for a cumulative effect with the intervals between the delivery of successive units to afford ample time for the hacking mechanism to operate.

The invention further provides novel improved features of automatic coöperative control between the driving mechanisms for the several parts by the action of the on-moving brick streams.

Still further features of the invention relate to an improved form of hacking clamps, to the means for supporting and controlling the movements thereof, and various other details as will hereinafter appear.

The invention contemplates the handling of a number of continuous, adjacent streams of bricks simultaneously produced, and in certain aspects of the invention any number of streams may be handled; in other aspects to be set forth in detail, such number of streams should be some multiple of two, the embodiment to be described showing four streams for simplicity of illustration.

Considering first the preferred embodiment of the invention herein illustrated in its general aspects, the continuous brick streams are delivered from the molding machine to an off-bearing belt having a cutting device coöperative therewith for severing the individual bricks, these parts being movable in synchronism with the brick stream delivery. Immediately beyond the cutting device a more swiftly moving separating conveyer receives the successive bricks and draws them rapidly away so as to avoid injury thereof by the cutting device on its return movement. Since a like operation is performed upon each of the streams of bricks being delivered by the molding machine, the treatment of a stream to be described may be taken for the present as typifying that of the whole number of streams.

From the separating conveyer the separated bricks are bunched together in subunits of a convenient number, shown as twelve in each of the four streams, with a small interval between bunches, upon a conveyer section capable of holding a number, shown as eight, of such bunches or subunits, which during the bunching operation moves at a speed less than that of the separating conveyer but slightly in excess of the initial speed of the on-coming stream of bricks. After being loaded with a full complement of bricks, shown as eight sub-units of twelve in each of the four streams, such conveyer section is given a speeded-up movement to a subsequent receiving conveyer similarly accelerated, such subsequent conveyer or receiver constituting one of a plurality of similar hacking belts from which the several sub-units or bunches are lifted to be deposited in proper hacked relation on the stack being formed. These plural hacking belts, shown as two, are shifted on a carriage transversely of the on-coming line of bricks, so as to bring each hacking belt successively into alinement with the brick line supply, the other belt or belts being at this time at rest at the side of the belt receiving a load,—this being a main unit heretofore described. A set of clamping mechanisms, one for each sub-unit of bricks, all carried by a common bridge support, is then brought into properly spaced-apart operative relation over a hacking belt thus shifted to one side and at rest, and simultaneously lifts all of such sub-units constituting a main unit from the belt and transfers them to a series of cars equal in number, shown as eight, to the number of sub-units of bricks. Means is provided for simultaneously shifting the several clamping mechanisms angularly through ninety degrees to place successive rows at right angles one to another, and the bridge or bridges which carry the set or sets of clamping mechanisms are movable by means of cranes to transfer the units of bricks from the respective hacking belts to the drier cars whereon they are deposited in properly hacked relation. These cranes have provision for movement cross-wise and also lengthwise of the line of cars to the extent necessary to lay the several longitudinal and cross-wise units respectively for successive layers.

I consider the arrangement of the plurality of transversely shifting hacking belts whereby an interval of absolute rest of the brick is effected, in which time the lifting mechanism can remove the brick from the belt while stationary, to be a most important feature of the invention both by itself and in combination with the particular conveyer system which delivers the units of bricks with a time interval between deliveries, these two features coöperating to produce a cumulative period within which the hacking of the units can be readily accomplished, and I intend to claim these matters broadly; I also intend to claim broadly the means whereby the driving mechanism is controlled by the brick unit itself as it reaches its fully loaded position on a hacking belt.

Figure 34:
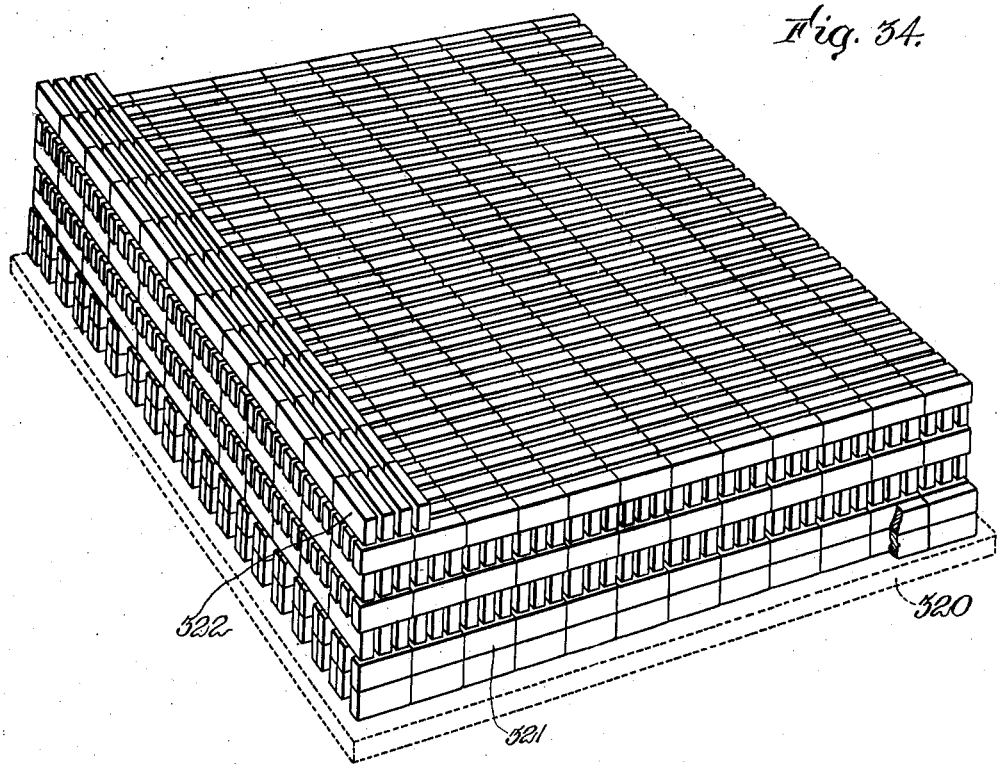
Figure 32:
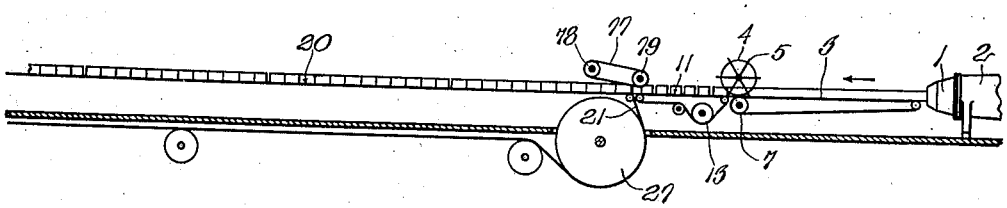

In the accompanying drawings, in which the entire apparatus is shown in a preferred embodiment, Figures 1, 2, 3, 4, 5, 6, are complementary views which, arranged in the order stated, constitute a side elevation of the conveyer system of the machine complete; Figs. 7, 8, 9, 10, 11, 12, 13, are complementary views which, arranged in the order stated, constitute a plan view of the belt conveyer system of the machine complete; Fig. 14 is a sectional detail on line 14—14 of Fig. 10; Fig. 15 is a detail partly in section of the operative mechanism for the shifting carriage; Fig. 16 is an end elevation partly broken away in section, of the shifting carriage and operating mechanism therefor; Figs. 17 and 18 are complementary views which together show the brick lifting clamps and the carrier bridge therefor; Fig. 19 is a fragmentary end view of the bridge; Figs. 20 and 21 are plan and side views respectively of an intermediate part of the bridge with the brick clamp removed and the upper truss structure sectioned away; Fig. 22 is a side elevation of one of the brick clamps, with parts broken away; Fig. 23 is an end elevation of a brick clamp with its supporting and operating connections, with parts broken away; Figs. 24, 25 and 26 are end views of a brick clamp in different positions; Fig. 27 is a plan view showing one-half of a brick clamp, parts being broken away and sectioned for clearness of showing; Fig. 28 is a bottom plan view showing a detail of a brick clamp; Fig. 29 is a detail of a controlling switch connection; Fig. 30 is a diagrammatic view of the main and sub-unit forming mechanism; Figs. 31 and 32 are diagrammatic views showing the entire apparatus, particularly the hacking clamp construction, in side views; Fig. 33 is a diagrammatic plan of the entire apparatus; and Fig. 34 is a perspective of a partially formed stack of bricks as deposited in hacked relation on a car platform.

The invention is shown in connection with an auger type of molding machine for making bricks by the stiff mud process, but this is merely illustrative, and the organization is likewise adapted to coöperate with any brick making machine which produces continuous streams of molded bricks. Referring then to the construction shown, the properly mixed clay is delivered in a continuous stream or series of adjacent streams from the die head 1 of a usual stiff clay brick machine 2, the machine illustrated being for handling four such streams, to an off-bearing belt 3, a cut-off device 4 having a series of arms 5, being provided, with cutting wires for severing the streams into individual bricks in a manner known in the art. The off-bearing belt 3 and the cut-off device are geared together to operate in unison with each other and with the molded streams of bricks issuing from the machine. A shaft 6 having a driving pulley 7 thereon and having fixed thereto one of the drums of the off-bearing belt 3, constitutes a means whereby driving impulse may be imparted to the off-bearing belt, but such impulse is preferably not sufficient of itself to cause the movement of the belt and cut-off, the complement of force to cause the movement of these parts being supplied by the friction or pressure engagement of the oncoming brick streams. The shaft 6 is extended at the other side of the cutter with a worm 8 fixed thereon to engage with a worm wheel 9 on a shaft 10 for a purpose to which reference will later be made.

The bricks are received by a relatively swift moving conveyer element 11 immediately on being severed, and thus each brick as severed is quickly moved away from its severing wire so as to suffer no injury from contact therewith on its upward movement; it is apparent that this leaves a space between the severed bricks on the swift moving conveyer 11 as indicated in Fig. 1. The conveyer 11, as also the other conveyer portions to be referred to, may be formed of any suitable material, such as a belt of sheet steel, this being desirable on account of its durability and as its smooth surface readily permits a sliding movement of the bricks thereon, as requisite at certain points in the manipulation. The belt 11 is supported upon a roller table 12 and passes downward around a driving drum 13, geared as at 14 to a shaft 15 and connected with a shaft 30 of the main driving system, later to be described, by bevel gearing 16, and 84. Suitable tighteners as a roller 17 adjustable by the screw bolt 18 in the base, may be provided for the belt 11.

The separated bricks are delivered from the belt 11 to a forwarding conveyer portion, designated generally as 19, and of a length to hold a complete unit of bricks as they are to be delivered to the hacking mechanism; in the present machine ninety-six bricks in each line, or a total of three hundred and eighty-four bricks constituting such a unit. The conveyer portion 19 moves continuously forward but has provision for two speed movements, one, which will be termed a "loading movement" being timed at a slightly more rapid rate than the movement of the off-bearing belt 3; during this movement the complement of bricks which constitutes the unit or bunch as above described, is laid thereon from the swift conveyer 11. As the loading of the conveyer portion 19 with the row of bricks is completed, a second driving means is automatically thrown into action, which imparts thereto an accelerated rate of travel which will hereinafter be termed the "racing movement." This carries successive units of bricks swiftly away from the on-coming lines and provides for a substantial time interval between the delivery of units, thus in conjunction with coöperative mechanism to be later explained, effecting a considerable interval of rest for each unit on the ultimate conveyer section, affording ample time for the hacking clamps to operate. The particular form of two speed conveyer portion 19 shown consists in two belt sections 20, 21, each of a length sufficient to receive a full unit or bunch of bricks, these being mounted respectively upon inner wire cables 22 and outer wire cables 23 by means of suitable cross bars 24, 25. The wire cables 22, 23 are mounted upon forward pairs of grooved wheels 26, 27 respectively and upon rear pairs of similar grooved wheels 28, 29. The forward pairs of grooved wheels 26, 27 are loosely mounted upon a transverse shaft 30 and have rigidly connected therewith ratchet casings 31 and 32, there being a single casing 31 between the grooved wheels 26 connected with both, while there are two casings 32 outside the grooved wheels 27, the several casings being connected with the respective grooved wheels by connecting sleeves on the shaft 30. Between the casing 31 and the grooved wheels 26 a pair of drums 33 is mounted to support the belt sections 21, 22 as they successively pass therearound. All these ratchet casings are similar and each carries one or more pivoted pawl members normally held in engagement with ratchet wheels 34 fixed on the shaft 30 as by suitable springs. The shaft 30 is driven at relatively low speed through driving gear 35 from the driving source as hereinafter explained, and hence it is adapted through the ratchet wheel 34 to drive the wire cables and thus the belt sections 20 and 21, imparting what has been heretofore termed the "loading movement" to such belts. Supporting drums 33ª similar to the drum 33 are provided for the other end of the belt loop, these being rotatable on a sleeve 36.

The rear pairs of grooved wheels 28, 29, have provision to receive driving impulse at a relatively high speed from the driving shaft to effect periodically what has been termed the "racing movement" of the belt sections 20 and 21, and the means for automatically imparting properly timed periodic driving impulse for such racing movement will now be described. The pair of grooved wheels 28 is fixed to a sleeve 36 rotatably mounted on a shaft 37 journaled at 38 in the fixed framework, and the outer pair of grooved wheels 29 are fixed directly to said shaft. Driving impulse is periodically and alternately imparted to the sleeve 36 and shaft 37 from the sprocket pinions 39, 40, driven by sprocket chains 41, 42, from large sprocket wheels 43, 44 loosely mounted on a shaft 45. The sprocket wheels 43 and 44 each carry opposite outward clutch faces 46, 47 adapted to interengage with corresponding clutch elements 48, 49, slidably keyed on the shaft 45. The shaft 45 is driven by bevel gearing 50 from a main drive shaft 51 which has forward driving extension to also drive the shaft 30 as more particularly explained hereinafter. The slidably keyed clutch elements 48 and 49 have operating lever arms 52, 53 connected by a link 54 for simultaneous operation so that when either is thrown into engagement with a sprocket wheel clutch face the other will be thrown out, as clearly shown in Fig. 9.

The link 54 is suitably connected for actuation by an arm 55 fixed at one end of the shaft 56 extending lengthwise of the machine at one side of the belt conveyers and journaled in suitable bearings 57 in the framework. The other end of the shaft 56 has fixed thereto an arm 58 carrying spaced apart rollers 59, 60, adapted to be alternately engaged by cam formations 61, 62, on opposite sides of a gear wheel 63 on a stub shaft 64 journaled in bearings 65 in the framework. The gear 63 is driven by a pinion 66 fixed on the shaft 30. Yieldable connection from the rollers 59, 60, to the shaft 56 is effected by the springs 67 in connection with the arm 58 so as to avoid possible damage from the improper engagement of the clutch elements, the arm 58 being loosely mounted on the shaft 56 and said spring being interposed between said arm and the sides of a yoke 68 fixed to said shaft. It may now be understood that the cam wheel 63 is geared to be driven at such a speed and the lateral cam faces 61, 62 thereon are so proportioned that they will oscillate the shaft 56 to cause the sprockets 43, 44 to be successively clutched to their driver shaft 45 and thus in succession cause one or the other of the grooved wheel pairs 28 or 39 and the belt section carried thereby to be speeded up, while the other continues at its low speed, and that during such speeded up movement the forward grooved wheels being likewise speeded up, will run ahead of the driving shaft 30 this being permitted by the pawls of the casing 31, 32 slipping backward over the ratchets 34. As shown, see Fig. 30, the belt section 20 is loaded and the driving sprocket 43 has just been clutched to its driver shaft so as to commence the racing movement of said belt section while the belt 21 will be advanced to receive the on-coming load at its slow speed as driven by the forward pawl and ratchet connection 32, its speeding driver being then unclutched. The gearing 50 is proportioned to transmit a slower drive to the shaft 45 than the gears 35 do to the shaft 30 and this arrangement is utilized to provide means for disconnecting the fast driving clutch elements at the proper intervals, it being understood that when in intermediate position both the clutches 46, 48 and 47, 49 are disengaged. Fixed at the sides of the sprocket wheels 43, 44 are plates 69, 70 respectively, and through each of such plates and its associated sprocket wheel pins 71, 72 are mounted and guided to slide passing through apertures in the adjacent clutch faces 46 and 47 to engage the opposite, coöperative clutch faces 48, 49 respectively. Springs as shown at 73 may be associated with the respective pins to normally keep the same in contact with the faces 48, 49. The plates 69, 70 carry on their opposing faces cams 74, 75 arranged to engage said pins at proper periods to thereby push a clutch element 48 or 49 out of driving engagement. The parts just described are so proportioned that as the belt section starting from the loaded position as in Fig. 30 finishes the operative portion of its travel at the racing speed and delivers its load to the subsequent conveyer it will continue at the racing speed until its forward end catches up with the rear end of the other belt which is at that time being loaded, when the proper pin 71 or 72 will be operated by its cam 74 or 75 as the case may be, to disconnect the high speed drive and leave the belt to be advanced through the ratchet drive 34; this as before explained imparts a speed suitable for the loading movement, which continues until the belt has been fully loaded, when the racing drive is again imparted thereto, as set forth. The cycle of movements described is the same for both belt sections 20 and 21, the drive for each belt being shifted from the racing movement to the loading movement, when its forward end catches up with the rear end of the belt being loaded; the racing movement is inaugurated in the manner explained approximately at the time the loading is completed, that is, as the belt 20 is shown in Fig. 30, but this may commence at a somewhat later period without affecting the result, owing to a device now to be explained.

Means is provided for retarding the oncoming bricks as they are rapidly delivered in separated relation by the swift moving belt 11 to cause them to be properly alined and bunched in sub-units with small spaces between the respective sub-units on the belt being loaded; this to arrange the bricks for convenient handling by the hacking clamps to be later explained. In the machine as shown, these sub-units are twelve bricks long in each line, or forty-eight bricks, and there are eight of such sub-units in each main unit or load for a belt 20 or 21. This means, which may be termed a separating device is mounted over the delivery end of conveyer 11 and consists in a retarding plate 76 arranged to engage the bricks on the conveyer being for this purpose carried by a sprocket chain 77, which passes around sprocket wheels 78, 79 journaled in a frame 80 having a forward upward incline. The plate 76 is moved at the same speed as the belts 20, 21 as they are being loaded, by means of bevel gearing 81 from a shaft 82 suitably journaled in the framework and having a beveled pinion 83 at its lower end meshing with a large bevel gear 84 which is fixed on the shaft 30. The sprocket chain 77 is made about three inches longer than the length of a sub-unit of twelve bricks, so that the plate 76 will be brought around into operative position at the lower right hand end of the chain and adjacent the belt just ahead of every twelfth brick. As it advances to the left from this point it will retard and bunch the advance portion of each sub-unit, the while gradually being drawn upward away from the brick on account of the incline of the frame 80 until it nears the vertical line of the axis of sprocket wheel 78 when it will leave the top of the brick after having retarded and positioned enough of the brick so that the inertia of these will render them immovable as the succeeding bricks are delivered thereagainst. Since as before stated the belts 20 and 21 have their loading movement at a slightly faster rate than the oncoming streams of bricks, as delivered from the molding machine by belt 3, but considerably slower than belt 11 and since the plate 76 is moved at a like speed, it is evident that all the bricks will be forwarded as fast as supplied by belt 3 and that a small space will be left between the successive sub-units as they are loaded on one or the other of said belts by reason of the relative speeds of belt 11 and plate 76. The frame 80 has a depending guideway 85 for the plate 76, and the lower reach of the sprocket chain 77, and the plate 76, is pivoted to the chain 77 with a weight 86 to insure its swinging around into proper operative position. To insure proper guidance of the plate 76 and prevent the lower reach of the chain from sagging down, small wheels 76$^a$ connected with the pivot of the plate 76 are adapted to rest on and run along the guideway 85. Suitable adjustments for the frame 80 and the sprocket chain 77 are provided in the form of screw bolts shown as 87, the operation whereof is apparent from the showing without further description.

Motive power for operating the parts thus far described and also the shifting carriage and belts thereon to be later explained, is supplied by motor 88 suitably mounted on the framework of the apparatus laterally of the belt conveyer system. This motor is connected through reducing gearing 89, 90 and stub-shafts 91, 92 suitably journaled in the framework to drive the shaft 51 by means of bevel gearing 93. The shaft 51, as stated, drives the high speed belt operating shaft 45, through bevel gearing 50 and the low speed belt operating shaft 30, through shafts 98 and 101, the intermediate clutch and gear and gearing 35, and is ultimately connected with the off-bearing belt 3 by means of the worm and worm wheel connection 8 and 9, such worm and worm wheel connection having its worm element connected with the off-bearing belt and its worm wheel element connected with the shaft 51, whereby the off-bearing belt 3 is adapted to control the movement of shaft 51 and its driven parts, while the tendency of the shaft 51 to impart varied driving impulse in the other direction is prevented by the locking of the worm wheel teeth against the worm. This construction, as also means whereby further control of the drive of shaft 51 from the motor 88 is effected, is fully described and claimed in my copending application Serial No. 586,412 filed Oct. 10, 1910, and hence only a general description thereof is thought requisite in the present case. A rearward extension of the shaft 51, Figs. 2 and 8, is interrupted to form a cone friction clutch 94, the elements whereof are adapted to be held pressed against each other with adjustable pressure by a spring 95 fixed to the framework at 96 and adapted to be adjusted for variable pressure by a screw bolt 97. An extension 98 of the shaft 51 through the clutch 94 is in geared connection at 99 with the shaft 10 and thence to the off-bearing belt. The shaft portion 98 has geared connection 100 with a counter shaft 101 which shaft has fixed thereto at one end one of the gears 35 to drive the shaft 30 and its other end connected with a jack-in-the-box motor controller 102. An extension 103 of shaft 101 from the other side of the jack-in-the-box 102 is connected by gearing 104, including a reversing gear 105 suitably mounted on a stub-shaft to the shaft 51. The central ring 106 of the jack-in-the-box 102 is suitably connected to control the motor 88 similarly as in the application referred to. Further means to control the driving impulse from motor 88 is effected also in like manner as in said former application, by a brake device 107 interposed between sections of the shaft 98. This brake device consists of a casing 108 fixed to the framework within which ends of the two sections of shaft portion 98 abut, each shaft portion having an arm 109 fixed thereto, said arm portions being connected by a stiff brake band 110 arranged to come into frictional braking engagement with the fixed casing 108 whenever the motor 88 tends to drive the connected parts faster than the off-bearing belt control permits.

The mechanism so far described will thus deliver to a subsequent conveyer section successive main units of bricks in rows ninety-six long and, as shown, four wide, these being separated by short spaces into sub-units twelve long, with a time interval between deliveries of such main units. It is to be understood that such mechanism, viewed in connection with the apparatus to be later explained which provides for a period of rest for the main units on a conveyer section, in a broader aspect is merely illustrative, and that the time interval between deliveries of main units to such rest-period-producing mechanism could be effected in various other ways, for example by merely stopping the brick machine at intervals to produce the desired time period between deliveries of units to the subsequent mechanism now to be described.

The mechanism now to be explained cooperates with the previously described apparatus to produce a period of rest for the main units on a conveyer section in cumulative relation to said time intervals between deliveries of units, whereby ample time for the hacking clamps to operate is afforded. The construction for this purpose consists in an arrangement of the subsequent conveyer portion to which the belt sections 20 and 21 deliver, in duplicate or multiple, the belts of such conveyer portion being mounted on a transversely shiftable carriage so as to be alternately or successively brought into line with the antecedent conveyer system to receive their respective loads therefrom. The shiftable belts constituting such subsequent conveyer portion, shown as two in number at 111, 112, are mounted on a carriage 113 transversely shiftable on ways 114, 115, being supported by rollers 116, 117 carried by cross bar supports 118 of the carriage. The rollers 116 adjacent one end of said shiftable carriage are flanged at either side to fit over a correspondingly formed track portion 114, thus keeping the carriage in alinement; the rollers 117 at the other end are shown as plain. The two belts 111, 112 are similar and a description of the mounting of one of these will suffice for both. The top reach of these belts is supported by a roller table top 119 of the carriage 113. These belts pass at their receiving end over rollers 120 adjustable on an extension of the carriage as by bolt and nut adjustment 121. At their outer ends the belts pass over drums 122 suitably journaled at 123 in a framework on the carriage, thence over supporting rollers 124, 125, 126, thence around driving drums rotatable on a shaft 127, the driving drum for belt 111 being designated 128 and that for the belt 112 being designated 129. From the driving drums 128, 129 the belts are looped around pulleys 130 for tensioning adjustment, these pulleys having bearings 131 slidable in guideways 132 on the carriage and adapted to be adjusted for proper tensioning of the belts by screw bolt and hand wheel adjustment 133.

It is essential that the belt portions 111 and 112 be driven at the same rate of speed as the belt sections 20 and 21 in their racing movement, and to effect this the drums 128, 129 are alternately thrown into clutched engagement with the shaft 127, which has thereon a gear 134 meshing with a pinion 135 slidably fitted to a squared shaft 136 suitably journaled at 137 in the framework. The shaft 136 is in turn driven by geared connection 138 with the shaft 92, this train of gearing being so proportioned as to impart to a belt 111, 112 the proper rate of movement. The pinion 135, as also the gear 134, is inclosed by a casing 139 fixed as at 140 to the framework of the carriage, and this may engage bosses or washers at the sides of the pinion 135 to impart slidable movement thereto with the carriage along the squared shaft 136.

The driving drums 128, 129 are alternately actuated as their respective belts 111, 112 are brought into line with the antecedent conveyer system by having cone friction clutch elements 141, 142 fixed thereon engaged by corresponding clutch elements 143, 144 splined on the shaft 127. The clutch elements 143, 144 are engaged by shipper arms 145, 146 pivoted to the carriage framework, these levers being simultaneously actuated to throw either clutch in as the other is thrown out by a T-lever 147 pivoted to the framework and having its single arm 148 extending between the ends of the levers 145, 146, springs 149 affording a yielding operative connection between said parts. The double arm of the T-lever 147 has pivotal connection with the cores 150, 151 of solenoids 152, 153, which are alternately energized, as now to be explained, to cause the respective belt driving drums 128, 129 to be connected with the driving mechanism.

Transverse shifting movement is imparted to the carriage 113 by a set of lever arms 154, 155, 156 having pivoted fulcrums 157 at the base of the apparatus and their other ends have link connection 158 with the carriage adjacent the respective ends and centrally thereof, thus properly distributing the application of power. The lever arms 154—156 are connected intermediate of the length thereof for operation by suitable links 159 to cranks 160 on a shaft 161 suitably journaled at 162 in the base. The shaft 161 is driven by suitable reducing gear connection 163, 164, 165 from the shaft 166 of a motor 167, such reducing gearing being carried by proper counter shafts 168, 169 suitably journaled in a base support, as shown.

An important feature of the invention consists in the automatic control of the belt clutch controlling solenoids 152, 153 and the transverse carriage shifting motor 167 by the brick units as they become fully positioned upon a belt portion 111 or 112, and the mechanism to effect this will now be described. Pairs of lever arms 170, 171 are pivoted intermediate their length at 172 to a framework 173 fixed at the outer end of carriage 113, the pair of arms 170 being opposite the end of belt section 111 and the pair 171 being opposite the end of belt 112. The upper ends of the lever pairs 170, 171 have fixed thereto plates 174, 175 extending across the belts adjacent their ends by means of links 176, 177; these links being threaded for nut adjustment of the plates relative to the lever arms 170, 171 as shown, and having pivotal connection 178 therewith. The plates 174, 175 are supported by flanged rollers 179 adapted to run along ways 180 at the sides of the belts. The lower ends of the lever pairs 170, 171 are connected by links 181, 182 to crank arms 183, 184 on a switch operating shaft 185 which is journaled in and extends across the carriage 113, so that as either plate as 174 is engaged and pushed back by the oncoming brick lines, not only are the switches operated, but the other plate 175 coöperative with the other belt will be pushed forward in position for subsequent engagement by brick lines on the other belt. The switch operating shaft 185 has fixed thereon the movable elements of two switch mechanisms coöperative with the respective belts, that for the belt 111 having its movable contacts designated 186, 187. These movable contacts in connection with the corresponding fixed contacts 188, 189, are arranged to control the carriage shifting motor 167 and the solenoids 152, 153 simultaneously. The arrangement is such that as a plate as 174 is pushed back by the advance end of the brick line, the operation of a switch element as 186 will break the circuit of a solenoid as 153, while by the simultaneous actuation of the other switch mechanism in a reverse manner the other solenoid, as 152, is energized, thus shifting the clutch elements 143, 144 to stop the belt 111 and start the belt 112. The same oscillation of the shaft 185 thus imparted by the plate 174 causes the switch elements 187, 188 to close a circuit through motor 167, thus shifting the carriage over so as to bring the belt 112, just started into movement, in line with the conveyer system, while the now stationary belt portion 111 with its unit of bricks thereon is moved to one side in position for its load to be removed by the hacking clamps.

From the foregoing it may now be understood that the possible interval of rest for the brick units on a stationary belt portion, as afforded by the intervals between deliveries of units from the racing belt sections 20 and 21, is practically doubled by the duplicate belt portions 111, 112, and that this interval might be further multiplied if found desirable, by increasing the number of transversely shiftable belt portions.

The several sub-units, shown as eight, constituting a main unit, are simultaneously lifted from a belt portion 111 or 112 by a corresponding number of hacking clamps, all suspended from a common bridge structure 190 which is of a length to extend somewhat beyond a main unit at either end. This bridge is composed of an upper truss construction 191 from which are supported by posts 192 parallel rails 193 which serve as runways for clamp carrying trucks 194, these having guided support on said rails by flanged rollers 195.

The mechanism so far described is adapted to convey and deposit the bricks in hacked relation either upon drier cars or directly in a drier, or, if desired, directly in a kiln for burning. In the embodiment illustrated, the bricks are deposited upon a line of drier cars, and in such embodiment, it may now be understood that the several sub-units, described as twelve bricks long and four bricks wide, are deposited upon successive cars of a line on a track, each car having a rectangular platform with a transverse edge of the length of twelve bricks, (the longitudinal edge being herein shown of the same length, making a square platform; the length may obviously be some multiple of this if desired) so that at each deposit one sub-unit is laid upon each car; further that alternate rows of bricks are to be arranged crosswise of the line of conveyer movement. Mechanism is therefore provided to space the several clamp supporting trucks 194 a proper definite distance apart along the ways 193 of the bridge 190, and to effect this a cable 196 has one end fastened at 197 to a car adjacent one extremity of the bridge, as shown in Fig. 18. Thence the cable is passed around a drum 198 to receive operative movement therefrom, said drum being fixed on a shaft 199 suitably journaled on the bridge at 200, having fixed thereon a worm gear 201 driven by a worm 202 on the armature shaft of a motor 203. Thence the cable 196 passes over guide sheaves 204 to the last truck support 194' at the other extremity of the bridge, where it is looped around a pulley 205 carried by said truck support back over other guide sheaves 204 to the first truck 194 to which it is again secured at 207. The truck support 194' at the right hand extremity of the bridge, see Fig. 17, is fixed to the supporting rails 193 as by bolt connections 208, and this truck support is connected to the next movable truck and each of the movable trucks to each other by draw bars 209, these permitting a limited endwise movement of about four inches in practice, the exact amount being variable by nuts adjustable along threaded ends 210 of such draw bars. Assuming then that the several units are to be spread a distance of four inches, the motor 203 is energized to cause the cable to draw the adjacent end truck from the point 197; this truck being drawn a total of twenty-eight inches, since there are seven spaces to be made. After it is moved four inches its draw bar will cause it to pick up the next truck, which will thus move a total of twenty-four inches, and so on, until all the trucks are spaced the desired distance apart, the last truck support 194' remaining stationary. To return the trucks to initial position the motor is reversed, the cable then drawing upon the first truck 194 from the point 207 and this and the other trucks each engaging the succeeding one until all are again brought together. Limit switches 211 are arranged to be engaged by crank arms 212 fixed on the shaft 199 so that after the motor 203 has operated to properly space the cars in either direction, it will be deënergized by one or the other of said switches. A spring connection 213 is interposed in the cable 196 so that any slack therein is taken up and the cable kept taut.

To effect the turning of the several sub-units of bricks through ninety degrees for depositing the cross layers, the respective clamp holders 214 are journaled in depending relation to the trucks 194 by journals 215. The several clamp holders 214 are alike, each having its top portion formed as a sheave 216 and around all of such sheaves a cable 217 is passed, this cable being crossed as shown at 218, Fig. 20, around intermediate idlers 219 suitably journaled on the several trucks adjacent the abutting ends thereof as at 220. To keep the amount of cable 217 used uniform as the several trucks approach or recede from each other, other intermediate idlers 221 are mounted on the intermediate pivots 222 of lazy tongs 223 pivotally mounted on the pivots 220 and around these idlers the cable 217 is likewise looped. To impart motor impulse to the cable 217 it is passed around a pulley 224 fixed to a vertical shaft 225 depending from a tension carriage 226, rollers 227 whereof engage the rails 193 adjacent the end of the bridge. The shaft 225 has near its upper end worm and worm-wheel connection 228 with the armature shaft 229 of a motor 230 fixed on said tension car. The shaft 225 carries at its top a limit switch 231 controlling the circuit of motor 230, whereby said motor is stopped after operating to turn the clamp supports the proper distance. To keep the cable 217 under proper tension and take up the stretch thereof, the tension carriage 226 has fixed thereto at 232 a weight 233, the supporting cord thereof passing over a pulley 234 and the weight being guided by a rod 235. The trunnion supports for the sheaves 216 are removably clamped to the trucks, opposite lugs 236 thereof being engaged by clamp bolts 237 on corresponding lugs of a truck portion, other lugs 238 being thus clamped against other opposed truck portions.

The clamp supports proper consist of angle bars 239 extending nearly the full length of a sub-unit and supported from the sheaves 216 by rods 240 shown as four in number. These angle bars are assembled in proper spaced-apart relation with a series of cross braces and tie rods to be later described, the whole being rigidly interengaged and bolted to form a rigid substantial clamp-carrying framework.

It is to be understood that the lines of bricks as delivered by the molding machine and run out on the conveyer belts are spaced apart far enough so that the brick lifting clamps may be inserted between the lines with some little free space at the sides to avoid possible improper engagement, and mutilation of the bricks, by the descending clamps. To effect this, the lines of bricks are in practice spaced about one inch apart, and the brick clamps are composed of steel plates, those for the inside clamps being about one-sixteenth of an inch in thickness while the outer ones are about double this thickness. Since the bricks when in hacked relation should be only about three-eighths of an inch apart, it is necessary that the center and intermediate pairs of clamping plates be expanded to occupy a width of three-eighths of an inch and that the intermediate and outer clamps have a range of lateral movement toward the center sufficient to move the lines of bricks so that they will be three-eighths of an inch apart before clamping them. As operating mechanism to effect these results, pairs of solenoids 241 are vertically mounted in upstanding brackets 242 fixed to the clamp framework adjacent each end thereof, these solenoids having connections arranged to hold the clamps laterally withdrawn away from the bricks when energized, springs 243 being arranged in coöperative relation with such solenoids to expand the clamps of each pair and move them laterally to first position, and then clamp the bricks when the solenoids are deënergized.

The solenoids 241 of each pair are mounted in spaced-apart relation in the brackets 242 as shown in Fig. 24, and the respective cores are pivotally connected by an intermediate link or "evener" 244. Each member 244 has connection centrally between the solenoids by means of rod 245 with a yoke 246 secured to bars 247 extending lengthwise of the clamp frame and guided to slide vertically along bearing plates 248 fixed to and depending from the angle bars 239. It will be observed that the solenoid-supporting brackets 242 have also transverse flanged webs 249 which, being rigidly assembled with the angle bars 239, constitute a portion of the transverse bracing thereof. The vertically slidable bars 247 have fixed thereto at intervals opposite the respective sets of clamping plates, angle irons 250 having pivotal connection by means of links 251 with bell-crank levers 252 at the opposite sides of the clamp frame. These bell-crank levers are pivotally secured at 255 at the ends of projections 253 depending from frame bars 254, being fixed as to vertical position and having a capacity for bodily transverse movement therewith. The bars 254 have fixed thereto angle plates 256, which carry pivot connections 257 for parallel links 258, to the lower ends of which are pivotally mounted the outer clamp carriers 259. Springs 260 fixed to the bars 254 have their free ends extended into engagement with the clamp carriers 259 at 261, this parallel link and spring mounting for the outer clamp plates affording a yield therefor to allow for any irregularity in the thickness of the bricks being clamped.

Connections are provided whereby the center clamps 262 are likewise controlled from the bell-crank levers 252, and to this end they are mounted at the inner ends of sleeves 267 slidable on cross rods 264 carried by the plates 248. These sleeves are pivotally connected for actuation from the central parts 265 of the bell-crank levers 252 by means of links 266. The springs 243 which supply energy to expand the central clamps outward and simultaneously draw the outside clamps inward against the bricks, are held under compression between ears 267' obliquely depending from the outer ends of sleeves 267 and similar ears 268 obliquely depending in alinement therewith from the inner ends of sleeves 269 fixed at 270 to the plates 254. These sleeves 269 are slidably guided adjacent to and parallel with the sleeves 267 on rods 271 fixed to the plates as shown in Figs. 27 and 28. The operation of the central clamps 262 and of the outer clamps 263 will now be understood as follows. Assuming the solenoids to be energized, holding the bars 247 in their upper position as shown in Fig. 23, the clamps are lowered for embracing the bricks, whereupon the solenoids are deënergized and the bars 247 descend by gravity, actuating the connected parts in coöperation with the springs 243, causing the bell-crank levers 252 to turn first about the points 255 as pivots, whereby the sleeves 267 are first drawn outward through the link connections 266, expanding the center plates 262 against the adjacent sides of the bricks. Upon the conclusion of this movement the intermediate points 265 become the fixed pivots and further movement of the bell-crank levers through the pivot connections 255, projections 253 and plates 254, will cause the outer clamps 263 carried thereby through the yieldable link connections 258 to be moved inward against the outer sides of the outside bricks, this latter movement having a range sufficient to move the outside bricks inward sufficient for the spacing above explained and in conjunction with the intermediate clamping movement to be later explained to clamp the same so that they may be lifted.

In releasing the clamps from the bricks after they have been deposited in hacked relation, as shown in Fig. 24, the bars 247 are first raised one-half their distance of operative movement, switch connection being made to energize one solenoid of each pair for this purpose, and the connecting link 244 then occupying an inclined position as shown in Fig. 25. This movement closes the center clamps together and allows the outside clamps to expand sufficiently to release the bricks. The outside clamps next to the hacked bricks may come in contact therewith as shown at the left in Fig. 25 and swing in away from the springs 260, as there is then nothing to retard such inward movement of the clamps. The clamps are now ready to be drawn away from the bricks by the crane above, and when withdrawn, the switch controlling the other two solenoids on the opposite sides may be thrown in, which completes the travel of bars 247, bringing the clamps again back to the position shown in Fig. 23. The movements just described are complete for the operation of lifting and depositing the bottom or "grip" layers, as shown in Fig. 26, wherein the two lines of bricks at either side are moved close together with a wide intervening space as at 272, the intermediate clamps being lifted to inoperative position for this operation of laying the grip courses, as later described.

In the regular hacking operation, i. e., in laying the stack above the grip courses, the intermediate clamps 273 are lowered to operative position, and to effect this vertical movement these clamps are slidably mounted on rods 274 carried by a vertically movable central bar 275. This bar 275 extends lengthwise of the clamp frame having guide ways 275' therein, and is connected through crank arm 276, rock shaft 277 and crank arm 278 with the core 279 of central solenoid 280, this central solenoid being mounted in an upright bracket 281 which has a horizontal web portion 282 which constitutes one of the cross struts of the clamp frame. It is thus apparent that the intermediate clamps 273 can be raised and allowed to lower at will be energizing or deënergizing the solenoid 280.

The intermediate clamps when in operative position are expanded at the same time the other clamps are operated, to clamp the bricks, by wedge bars 283 fixedly depending from the rod 284, which rod is suitably secured to the vertically movable bars 247. To bring these clamps together to collapsed position, the inner ones have their carrier plates 285 engaged with uprights 286 fixed to the sleeves 269, these uprights being shown as socketed in lugs 287 at the inner ends of said sleeves as seen in Fig. 27; the inner intermediate clamps will therefore partake of the outward movement of bars 254, which actuate the outer clamps. The inward collapsing movement of the outer intermediate clamps is effected by any suitable automatic mechanism, springs 295, 296 (see Figs. 24 and 27) being herein shown on the ends of bolts 297, 298, spaced at suitable intervals apart along the opposite pairs of the clamps, cotter pins 299, 290 being herein shown at the opposite ends of said bolts. To make the slidable mounting of the intermediate plates 273 on the rods 274 a firm and reliable one, the upper ends of these plates are rigidly fixed to bars 300 and these are in turn bolted to flanged collars or sleeves 301 which have a sliding fit on the rods 274 and are retained thereon by cross pins 302 inserted through said rods. In the regular hacking with the intermediate clamps in use, it is necessary to provide means to limit the expansion of the center clamps, and to this end angle pieces having depending lugs 303 are fixed to the vertically movable bar 275 to be raised therewith, and these lugs when in lowered position as shown in Fig. 24 are adapted to be engaged by ears 304 extending up from the sleeves 267. When the intermediate clamps are withdrawn on the elevation of the bar 275 by the central solenoid 280, these lugs 303 will be raised so as to be clear of the ears 304, this permitting the further expansion of the center clamps for the grip course hacking, as seen in Fig. 26. It is obvious that when these lugs 303 are to be lowered to operative position the center clamps should first be brought together by energization of the end solenoids 241, so that the ears 304 will come within the lugs 303.

As shown, sets of springs 243 and operating sleeves 267, 269, are interposed between each two pairs of clamps through the length of the clamp frame, as seen in Fig. 27, but it is obvious that these may be otherwise disposed with slight modifications in the connections, if found desirable. Preferably the center clamps are made as continuous plates extending substantially the full length of the clamp carrier, while the intermediate and outer clamps are individual ones for each brick,—this to allow for slight irregularities or variations of thickness in the bricks.

Referring to Figs. 31 and 33, the crane structures for carrying the clamp bridges 190 are shown at 305, these clamp bridges and cranes being arranged in duplicate at either side of the transversely shiftable conveyer belt table. These cranes each comprise trolley support members 306 directly connected with the clamp bridge as by cables 307 operable by motor 307' to lift and lower the bridge in usual manner and being movable lengthwise of the system to permit the successive deposits of brick units in the proper positions on the cars. The crane frame work 308 which affords tracks for the trolley supports 306, is bodily movable transversely, having flanged rollers 309 operable on tracks 310, whereby the crane and the bridge 190 carried thereby can be run along said tracks from a position over a conveyer belt section on the transversely shiftable table wherefrom it picks up its load of bricks to a position over the series of drier cars 311 whereon the bricks are to be deposited. As shown in Fig. 33, the conveyer belt portion 111 is in position to receive the oncoming lines of bricks from the conveyer system, while the belt 112 is shifted to one side, it having its load taken up by the set of clamps on a bridge 190 thereover. The other set of clamps on the other bridge as at 190' is finishing its deposit on a set of cars 312 at that side of the system, whereupon the crane carrying this bridge 190' will be run back to the position which belt portion 111 will occupy when shifted laterally, as shown at 313. Any desired number of parallel tracks as at 314 may be provided so that several sets of cars may be in readiness to receive their loads, one such extra set being shown at 315. Transfer track sections 316 movable along cross tracks 317 are provided, these tracks being adapted to be brought into register with any of the tracks 314 to receive the cars therefrom, or with any of a series of tracks 318 on which the cars may be run to a desired delivery point. Other like transfer tracks 319 are shown at the other end of this portion of the apparatus to further facilitate the car movement.

The operation of the system as a whole may now be understood. The successive units of bricks shown as ninety-six long and four wide, spaced apart into sub-units of twelve in each,—though it is to be understood that all these numbers are merely illustrative and in no way restrictive,—are delivered to the shiftable belt portions 111, 112 with a time interval between deliveries effected by the operation of the "racing belt" mechanism described. These intervals between deliveries are extended as intervals of rest for the brick units by reason of the plural transversely shiftable belt portions 111, 112, affording ample time for the clamping mechanisms to operate. These clamping mechanisms and the cranes therefor being likewise constructed in duplicate, a further multiplied interval is provided during which the clamps can be manipulated to pick up, transfer, and properly deposit their loads upon the set of cars.

It is to be understood that each of the drier cars 315 has its platform 320 of a size to receive lines of bricks twelve long transversely (and the same or some multiple thereof longitudinally) i. e., the length of a sub-unit carried by each clamp frame, though it is again to be understood that this size and the size of such sub-units given is only illustrative, and large or smaller sub-units can likewise be handled, the size of the car platforms 320 being likewise varied. Referring to Fig. 34, the grip courses shown at 321 are first deposited, these being shown as two high. The regular hacked stack thereafter is deposited thereabove, alternate layers being crossed, as shown. In depositing the layers lengthwise of the cars, the cranes will of course be moved along the tracks 310 the width of four bricks as spaced apart in hacked relation, for each deposit. As the cross layers of bricks are being deposited, the clamp carriers are swung around at right angles to the bridge by means of the swivel connection 215, 216 and the bridge moved lengthwise by means of the trolley support 306 a proper distance for the successive cross deposits, the first cross deposit of a layer being shown at 322 Fig. 34.

To illustrate possible variations in construction and arrangement within the scope of my invention, I have shown in Fig. 27 in dotted line an arrangement of clamp carrier having clamps for sub-units of sixteen bricks long, this of course requiring a corresponding variation in the delivery conveyer mechanism and a correspondingly enlarged car platform 320.

I consider my invention to be a pioneer one in the art, and I intend to cover broadly the features of invention set forth, more especially those centering around the construction and arrangements whereby in connection with a continuous brick supply an extended time interval of rest for the brick units is provided, during which hacking mechanism can be operated to transfer the bricks to a desired point.

While my invention is primarily intended for the handling of bricks as already stated it will be understood that the arrangement of belts, and conveyer system may readily be adapted for handling other articles than bricks and for other uses than hacking, and therefore, while I intend to claim the various features of my invention, both broadly and narrowly, it will be understood that I am not limited in the respects herein mentioned excepting as specifically required in certain of the more limited claims.

It is thus to be understood that the term "bricks" is employed both in the preceding description and in the following claims in an illustrative and not in a restrictive sense, and is intended to include not only the specific bricks used for building purposes, but any articles or material adapted to be handled by the mechanism as defined in the several claims.

Having described my invention, what I claim as new and desire to secure by Letters Patent is, 1. The combination with means for forwarding a continuous line of material, of a conveyer system for delivering the same, said conveyer system comprising a portion arranged to deliver the material in definite units from the receiving point to a subsequent conveyer portion with a time interval between deliveries, and a subsequent conveyer portion constructed to definitely increase said time intervals as extended periods of rest of a predetermined length sufficient to permit a unit of material to be removed by handling mechanism.

2. The combination with means for forwarding a continuous line of material composed of individual pieces, of a conveyer system comprising a part arranged to receive the individual pieces of material and deliver the same to a subsequent part in units with a time interval between deliveries, and a subsequent conveyer part arranged for automatic coöperation with said first part to receive and deliver said units with further definitely extended intervals between deliveries.

3. The combination with means for forwarding continuous parallel lines of material, of a conveyer system for receiving said lines comprising means for delivering the material to handling mechanism in main units with a time interval between deliveries and means for sub-dividing said units into sub-units for handling purposes.

4. The combination with means for receiving a line of material, of a conveyer system for delivering the same, said conveyer system having a portion formed in plural parts arranged to successively receive material thereon without destroying its line formation and means for shifting said parts so that each is successively out of receiving position and at rest to permit the material to be removed therefrom.

5. A brick hacking apparatus, comprising means for delivering bricks in units at regular intervals, and receiving means for said units constructed and arranged for automatic coöperation with said delivery means to increase the intervals between unit deliveries as definitely predetermined extended periods of rest, when loaded.

6. A brick hacking apparatus, comprising means for delivering bricks in units at intervals, means for receiving the units so delivered, constructed and arranged for automatic coöperation with said delivery means to multiply the intervals between deliveries as definitely predetermined extended periods of rest, and means arranged to take the bricks from said receiving means during such periods of rest for further handling.

7. A brick hacking apparatus, comprising means for delivering bricks in units at intervals, means for receiving the units so delivered constructed and arranged for automatic coöperation with said delivery means to multiply said delivery intervals as definitely predetermined extended periods of rest, and a hacking device for removing the units from said receiving means and depositing the same in hacked relation.

8. A brick hacking apparatus, comprising means for delivering bricks in units at intervals with a line formation, movable means for receiving the units so delivered, and operating mechanism for intermittently moving said receiving means and constructed and arranged to coöperate with said unit delivering means to present the brick units in line formation for further handling and to extend said unit delivery intervals as extended periods of rest.

9. A brick hacking apparatus, comprising means for successively delivering bricks in units, a brick receiver having a total capacity for a plurality of said units and adapted to receive the same in lines, and means for intermittently moving different parts of said receiver into and out of brick receiving position, said means constructed to provide intervening intervals of rest for the removal of the bricks.

10. A brick hacking apparatus, comprising means for successively delivering bricks in units, a brick receiver having a total capacity for a plurality of said units and adapted to receive the same in lines, means for intermittently moving different parts of said receiver into and out of brick receiving position, said means constructed to provide intervening intervals of rest for the removal of the bricks, and a controller for said receiver moving means arranged to be rendered active by the positioning of bricks on said receiver.

11. A brick hacking apparatus, comprising means for delivering a succession of bricks in definite formation, a receiver for the bricks constructed in multiple adapted to receive a load without breaking up said formation, and means for intermittently shifting said receiver to bring successive parts thereof into brick receiving position and to provide intervals of rest for another part, so that bricks may be removed therefrom.

12. A brick hacking apparatus, comprising mechanism for delivering bricks successively in definite formation, a brick receiver constructed in multiple adapted to receive a load without breaking up said formation, and means for intermittently shifting said receiver to bring and hold for an interval each of the multiple parts thereof successively in line with the brick delivery, providing also an interval of rest for another multiple part to permit removal of the bricks.

13. A brick hacking apparatus, comprising means for successively delivering bricks in line formation, receiving mechanism for the bricks movable with said line formation, and means for intermittently shifting said receiving mechanism out of the line of brick delivery to provide intervals of rest therefor during which bricks may be removed.

14. A brick hacking apparatus, comprising means for receiving continuous lines of bricks from a forming machine, a two speed conveyer portion for delivering the bricks in units with an interval between deliveries, and a subsequent conveyer portion for receiving such units, constructed for automatic operation to definitely increase the intervals between deliveries as predetermined extended periods of rest.

15. A brick hacking apparatus, comprising means to receive continuous lines of bricks from a forming machine, a conveyer portion arranged to deliver the bricks in units with an interval between deliveries, and a subsequent conveyer portion arranged to receive the units so delivered, and with plural parts disposed for successive periods of rest, said subsequent conveyer portion being formed and arranged to be automatically loaded from said first conveyer portion.

16. A brick hacking apparatus, comprising a conveyer system having a portion arranged to receive continuous lines of bricks and to deliver the same in units with an interval between deliveries, and a subsequent conveyer portion to receive such units and formed in multiple so that one part thereof may be in brick receiving position while another part is at rest, to permit removal of the bricks, said subsequent conveyer portion being formed and arranged to be automatically loaded from said first conveyer portion.

17. A brick hacking apparatus, comprising means for receiving continuous lines of bricks and delivering the same in units with an interval between deliveries, receiving means for the units so delivered constructed in multiple adapted to receive the bricks without disturbing the line formation, and means for operating said receiving means to bring each multiple part thereof alternately into brick receiving position and away from such position to permit removal of the bricks, said operating means being arranged for automatic cooperation with said first named means to definitely extend the time intervals between deliveries as predetermined periods of rest.

18. A brick hacking apparatus, comprising means for receiving continuous lines of bricks and delivering the same in units at intervals, a receiver for the units so delivered constructed in multiple adapted to receive the bricks without disturbing the line formation, means for alternately bringing each part of said multiple receiver into and out of brick receiving position, and means for removing the bricks from such receiver part when out of brick receiving position.

19. A brick hacking apparatus, comprising means for receiving continuous lines of bricks and delivering the same in units at intervals, a receiver for the units so delivered constructed in multiple endless portions, means for alternately bringing each part of said multiple receiver into and out of brick receiving position, and means for imparting movement to each part of said receiver when in brick receiving position.

20. A brick hacking apparatus, comprising means for delivering bricks in alined units at intervals, a receiver for the brick units arranged to receive the lines of bricks without breakage of their line formation, means for moving said receiver into and out of brick receiving position, and a controller for said means arranged to be actuated by a unit of bricks when positioned on said receiver.

21. A brick hacking apparatus, comprising means for delivering bricks in alined units at intervals, a receiver for the brick units arranged to receive the lines of bricks without breakage of their line formation, having provision for movement in time with said brick delivering means, means for moving said receiver into and out of brick receiving position, and a controller for said means arranged to be actuated by a unit of bricks when positioned on said receiver, said controller arranged to also govern the said timed receiver movement.

22. A brick hacking apparatus, comprising means for delivering bricks in alined units at intervals, a receiver for said units constructed in multiple arranged to receive the lines of bricks without breakage of their line formation, and means for moving the parts of said receiver transversely of the line of brick delivery to bring different parts thereof successively into line with said delivering means.

23. A brick hacking apparatus, comprising means for delivering bricks in alined units at intervals, a receiver for said units constructed in multiple arranged to receive the lines of bricks without breakage of their line formation, a support for said receiver movable transversely of the line of brick delivery, and means for operating said support arranged to be controlled by the positioning of a unit on said receiver.

24. A brick hacking apparatus, comprising means for delivering bricks in units at regular intervals, plural belts adapted to be successively brought into brick receiving position, and a shiftable support for said belts.

25. A brick hacking apparatus, comprising means for delivering bricks in units at regular intervals, plural belts adapted to be successively brought into position to receive said units, a common shiftable support for said bolts and means for rendering each belt active and inactive as it is brought into and out of brick receiving position respectively.

26. A brick hacking apparatus, comprising means for delivering lines of bricks, plural belts mounted to be successively brought into position to receive said lines, means for operating said belts when in brick-receiving position, and a controller for said means arranged to be rendered active by engagement of the advance end of a brick line therewith, to disconnect a belt from its operating mechanism when fully loaded with bricks.

27. A brick hacking apparatus, comprising means for delivering bricks in parallel lines, plural belts mounted to be successively brought into position to receive said lines, means for operating said belts, including a shiftable clutch mechanism, a magnetic controller for said clutch mechanism, and means arranged to be operated by contact with the advance end of a brick line for actuating said controller to disconnect said operating mechanism as each belt is fully loaded.

28. A brick hacking apparatus, comprising means for delivering said bricks in lines, plural belts mounted to be successively brought into position to receive said lines of bricks, operating mechanism for said belts, including shiftable clutch mechanism, and means for simultaneously shifting said clutch mechanism to disconnect the same from a loaded belt and to connect the same with a belt to be brought into loading position.

29. A brick hacking apparatus, comprising means for delivering bricks in parallel lines, belts mounted to be successively shifted into position to receive said lines of bricks, means for operating said belts when in loading position, means for shifting said belts to and from loading position, and means arranged to be actuated by the advance end of a brick line for simultaneously disconnecting the operating mechanism from a loaded belt and shifting said belts to bring an empty belt into loading position.

30. A brick hacking apparatus, comprising means for delivering lines of bricks, belts for receiving said lines of bricks, a transversely shiftable support for said belts having means for shifting the same, a power drive for said belts, including clutch mechanism, a magnetic controller for said clutch mechanism, and means arranged to be actuated as a belt is fully loaded, for simultaneously energizing said belt-support shifting means and actuating said clutch mechanism controller.

31. An apparatus of the kind described, comprising means for forwarding continuous lines of material, means for delivering successive portions of said lines in main units of definite length with each main unit divided into sub units, a set of cars having platforms of a combined length to receive said main units with each car platform of a length to receive a sub unit, and means for transferring said main units to said cars.

32. An apparatus of the kind described, comprising means for forwarding continuous lines of articles, a conveyer system for receiving said lines, and successively delivering consecutive portions thereof in main units of definite length with each main unit divided into sub units, a set of cars having platforms of a combined length to receive said main units with each car platform of a length to receive a sub unit, and means for transferring said main units transversely of said conveyer system to said cars.

33. An apparatus of the kind described, comprising means for forwarding continuous lines of material, a conveyer system for receiving said lines and having provision to deliver the material in successive main units and each main unit sub-divided into a number of sub-units, a set of cars arranged laterally of said conveyer system, and means for transferring said main units from said conveyer system to said cars and depositing the several sub-units thereof on the different cars of said set in definite relation.

34. A brick hacking apparatus, comprising means for receiving continuous lines of bricks, a subsequent conveyer system for delivering said bricks at intervals in main units with each main unit divided into bunches, and means for transferring said bunches during such intervals transversely of said conveyer system and depositing the same in hacked relation on drier cars.

35. A brick hacking apparatus, comprising means for receiving continuous lines of bricks, and a subsequent conveyer system constructed to deliver said bricks in spaced-apart bunches, a set of cars, and means for simultaneously transferring a number of said brick bunches from said conveyer system to the respective cars of said set.

36. A brick hacking apparatus, comprising a conveyer system for receiving continuous lines of bricks and for delivering the same to a hacking mechanism, a set of cars arranged on a track alongside said conveyer system, and means for simultaneously transferring the bricks in bunches from said conveyer system to the several cars of said set and depositing the same thereon in hacked relation.

37. A brick hacking apparatus, comprising a conveyer system arranged to receive continuous lines of bricks and to deliver the same to a hacking mechanism in main units with a time interval between deliveries, a set of cars arranged alongside the delivery portion of said conveyer system, and means for transferring said main units from said conveyer system and for depositing the same in hacked relation on said cars, said transfer means being arranged to apportion the bricks among the several cars of said set.

38. A brick hacking apparatus, comprising a conveyer system arranged to receive continuous lines of bricks and to deliver the same to hacking mechanism, the delivery portion of said system having provision for alternate periods of movement in a loading position and of rest in an unloading position, a track adapted to receive a set of drier cars arranged alongside the delivery portion of said conveyer system, and means for transferring the bricks in main units from said conveyer system to a set of cars on said track in hacked relation to simultaneously load the several cars of said set.

39. A brick hacking apparatus, comprising means for successively delivering bricks in main units with a definite line formation, a receiver for the bricks adapted to receive the units without destroying said definite formation, constructed in multiple, means for shifting said receiver to successively bring the multiple parts thereof into brick-receiving position, a set of cars, and means for transferring the bricks from each receiver portion, when it is out of brick-receiving position, to said cars.

40. A brick hacking apparatus, comprising a plurality of receiver belts, means for shifting said belts transversely, means for loading said belts with bricks when in one shifted position, and means for transferring the bricks from said belts when in another shifted position.

41. A brick hacking apparatus, comprising a plurality of brick receiving belts, a transversely shiftable support therefor, means for loading the respective belts with bricks when in one shifted position, and means for transferring the bricks from said belts in another shifted position thereof and depositing the same in hacked relation.

42. A brick hacking apparatus, comprising a plurality of receiver belts, a transversely shiftable support therefor, means for loading the respective belts with bricks when in one shifted position, a track arranged alongside said belts, and means for transferring the bricks from said belts when in another shifted position to a set of cars on said track and depositing the same thereon in hacked relation.

43. A brick hacking apparatus, comprising plural receiver belts, a transversely shiftable support therefor, means for loading the respective belts when in one shifted position, receiving platforms disposed adjacent said belts at either side, and means for transferring the bricks from the respective belts when out of loading position and depositing the same in hacked relation on said platforms.

44. A brick hacking apparatus, comprising plural brick-receiving belts, arranged in parallelism, a transversely shiftable support therefor, means for loading the respective belts with bricks when in one shifted position, tracks at the opposite sides of said belts adapted to receive a set of drier cars, and means for transferring the bricks from said belts when shifted out of loading position, to simultaneously load the several cars of said set.

45. A brick hacking apparatus, comprising a conveyer system adapted to receive continuous lines of bricks and having a delivery portion, means for shifting said delivery portion back and forth between a position in register with the rest of the conveyer system and an unloading position out of register therewith, said delivery portion adapted to have alternate periods of movement to receive loads of bricks and of rest in unloading position to permit their transfer, a loading platform adjacent said conveyer delivery portion, and means for transferring the bricks and depositing the same on said platform in hacked relation.

46. A brick hacking apparatus, comprising plural brick receiving conveyers, means for shifting the same transversely, means for loading the respective conveyers when in one shifted position, a crane shiftably supported over said conveyers, and hacking devices carried by said crane, adapted to transfer bricks from said conveyers when shifted out of loading position.

47. A brick hacking apparatus, comprising plural receiving conveyers arranged in parallelism, a common transversely shiftable support therefor, means for loading said conveyers when in one shifted position, and plural brick clamping mechanisms transversely shiftable over said conveyers at either side thereof, said clamping mechanisms arranged to clamp the bricks on said conveyers and deliver the same in hacked relation.

48. A brick hacking apparatus, comprising a receiving conveyer, means for delivering bricks thereto in main units divided into sub-units, brick clamping mechanism transversely shiftable over said receiving conveyer and arranged to simultaneously clamp said sub-units individually and deliver the same in hacked relation.

49. A brick hacking apparatus, comprising a receiving conveyer having periods of movement to receive brick loads and periods of rest to permit the transfer thereof, brick clamping mechanism movable over said conveyer having a series of like parts individually adjustable to separately clamp sub-units of bricks, and means for individually transferring such sub-units and delivering the same simultaneously in hacked relation.

50. A brick hacking apparatus, comprising a conveyer system adapted to deliver bricks in units, a clamping mechanism mounted for movement over the delivery portion of said system, said clamping mechanism comprising a set of clamping devices having relative longitudinal adjustment, adapted to clamp the bricks in individual bunches or sub-units and deliver the same in hacked relation.

51. A brick hacking apparatus, comprising a conveyer system adapted to deliver bricks in a series of alined bunches, a brick clamping mechanism mounted for movement over a delivery portion of said system, said clamping mechanism comprising a series of individually movable clamping devices mounted for angular adjustment so as to be capable of extending in alinement lengthwise of said series of alined bunches or crosswise thereof in transverse parallelism with one another at will.

52. A brick hacking apparatus, comprising a conveyer system adapted to deliver bricks in a series of alined bunches and clamping mechanism mounted for movement transversely over a delivery portion of said system, comprising a series of clamping devices individually adjustable lengthwise of the conveyer system to simultaneously engage the several alined bunches and having provision for turning at right angles thereto to deliver the bricks in crosswise hacked relation.

53. A brick hacking apparatus, comprising a conveyer system adapted to deliver bricks in a series of alined bunches, a clamping mechanism extending in parallelism with the series of units so delivered mounted for transverse movement over a delivery portion of said system, and tracks having a set of rectangular cars thereon arranged alongside said delivery portion, said clamping mechanism having individually adjustable clamping devices adapted to each engage one of said bunches to permit deposit of alternate layers in lengthwise and crosswise hacked relation on said cars.

54. A brick hacking apparatus, comprising a conveyer system, brick clamping mechanism mounted for transverse movement over a delivery portion thereof, and a track having a set of drier cars thereon arranged alongside said clamping mechanism, said clamping mechanism consisting of a set of individually adjustable clamping devices having separate angular movement, said devices adapted to simultaneously deposit bunches of bricks in hacked relation on the several cars of said set.

55. A brick hacking apparatus, comprising means for receiving and forwarding a continuous line of bricks, means for dividing said line into bunches or sub units, and means for successively segregating a plurality of such bunches from the following portion of the line without destroying the line formation so that said bunches may be engaged by a transferring mechanism.

56. A brick hacking apparatus, comprising means for receiving and forwarding a continuous line of bricks, means for dividing said line into bunches or sub units, and means for simultaneously moving a plurality of such bunches forward at an accelerated rate with relation to the on coming brick line so as to make a substantial time interval between deliveries, said means being constructed to preserve the line formation of the bricks.

57. The combination with means for receiving a line of material, of means for delivering the same comprising a conveyer portion formed with plural parts, adapted to receive the material without destroying its line formation and each adapted to be successively brought into position to receive material, means for periodically shifting said parts transversely to move the same successively out of receiving position and to leave the same for a substantial interval in a position of rest to permit removal of the load and means for removing the load during said interval.

58. The combination with means for delivering a line of articles in definite units, of a receiving conveyer of a length to receive said units and constructed in plural parts adapted to receive the material without destroying its line formation and to be successively brought into receiving position, means for moving said parts successively out of receiving position to leave the same at rest for a substantial interval to permit removal of the load and means for simultaneously removing the articles constituting said unit during said interval of rest.

In testimony whereof, I have signed my name to this specification, in the presence of two subscribing witnesses.

RAYMOND C. PENFIELD.

Witnesses:
 H. S. SIMPSON,
 C. P. MERTENS.